(12) United States Patent  
Sakurai et al.

(10) Patent No.: US 8,036,481 B2  
(45) Date of Patent: Oct. 11, 2011

(54) IMAGE PROCESSING APPARATUS AND IMAGE RESTORATION METHOD AND PROGRAM

(75) Inventors: Junzou Sakurai, Tokyo (JP); Takanori Miki, Kanagawa (JP); Fuminori Takahashi, Nagano (JP); Hiroaki Komatsu, Nagano (JP)

(73) Assignees: Eastman Kodak Company, Rochester, NY (US); Nittoh Kogaku KK

( * ) Notice: Subject to any disclaimer, the term of this patent is extended or adjusted under 35 U.S.C. 154(b) by 1076 days.

(21) Appl. No.: 11/616,985

(22) Filed: Dec. 28, 2006

(65) Prior Publication Data

US 2008/0013850 A1    Jan. 17, 2008

(30) Foreign Application Priority Data

Jul. 14, 2006  (JP) ................................. 2006-194944

(51) Int. Cl.  
    *G06K 9/40*    (2006.01)
(52) U.S. Cl. ......... 382/255; 275/263; 275/266; 275/270
(58) Field of Classification Search .................. 382/255, 382/275, 263, 266, 270  
See application file for complete search history.

(56) References Cited

U.S. PATENT DOCUMENTS

| | | | | |
|---|---|---|---|---|
| 5,535,291 A * | 7/1996 | Spencer et al. | ................ | 382/254 |
| 6,636,645 B1 * | 10/2003 | Yu et al. | .................. | 382/268 |
| 7,079,179 B2 | 7/2006 | Sumitomo et al. | | |
| 2001/0008418 A1 * | 7/2001 | Yamanaka et al. | ............. | 348/222 |
| 2003/0169944 A1 * | 9/2003 | Dowski et al. | ................ | 382/279 |
| 2005/0231603 A1 * | 10/2005 | Poon | ........................ | 348/208.99 |

FOREIGN PATENT DOCUMENTS

| | | |
|---|---|---|
| JP | 2002-288653 | 10/2002 |
| JP | 2004-205802 | 7/2004 |

OTHER PUBLICATIONS

Jan Biemond, Iterative Methods for Image Deblurring, IEEE 1990.*  
Superresolution Restoration of an Image Sequence: Adaptive Filtering Approach, pp. 387-395, Michael Elad, IEEE Transactions on Image Processing, vol. 8, No. 3, Mar. 1999.

* cited by examiner

*Primary Examiner* — Wesley Tucker  
*Assistant Examiner* — Mark Roz  
(74) *Attorney, Agent, or Firm* — Peyton C. Watkins

(57) ABSTRACT

An image processing apparatus is provided which performs image restoration as necessary while a computing processing burden based on an image restoration algorithm is reduced. RAW data of a blurred image is input to an RGB interpolation section. The RGB interpolation section generates an R component image, a G component image, and a B component image based on the RAW data. The G component image is input to an image restoration processing section and the R and B component images are input to an RGB to YCC section. The image restoration processing section performs an image restoration process based on a predetermined image restoration algorithm by using a PSF image representing a predetermined point spread function. The RGB to YCC section generates a brightness component image Y and color difference component images CR and CB based on the G component image having been subjected to the image restoration process and the R and B component images which was not subjected to any image restoration process.

11 Claims, 18 Drawing Sheets

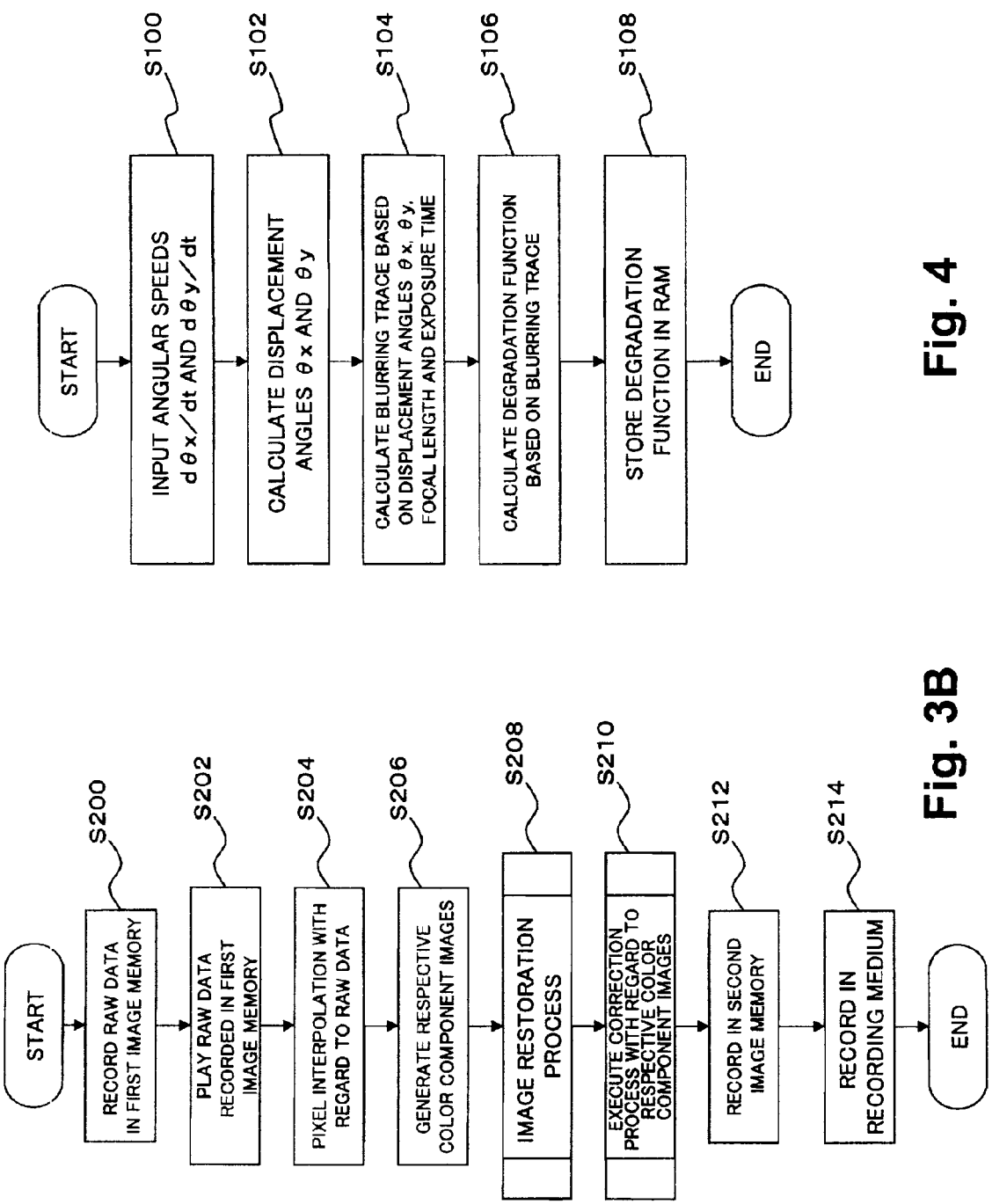

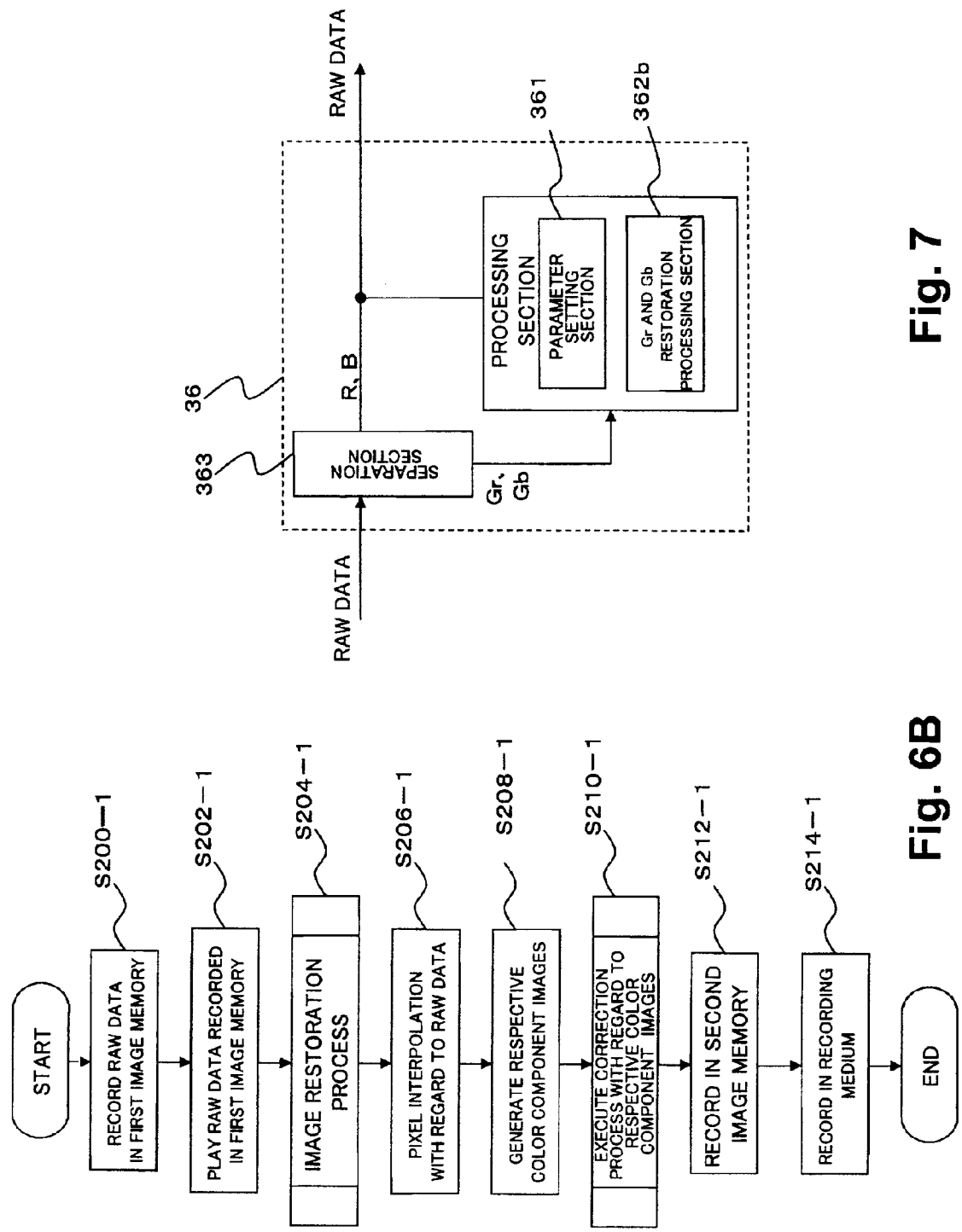

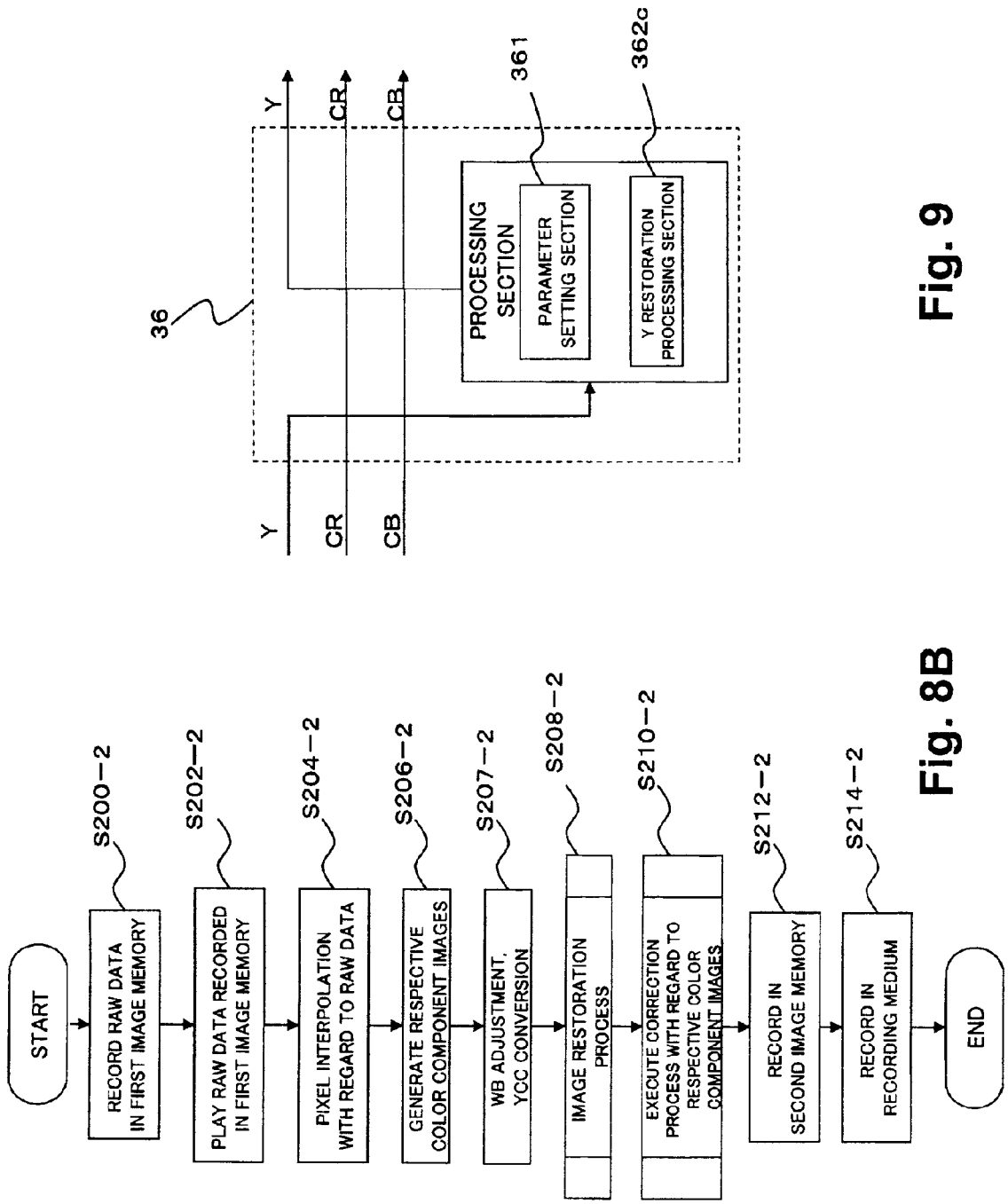

IMAGE PROCESSING APPARATUS AND IMAGE RESTORATION METHOD AND PROGRAM

CROSS REFERENCE TO RELATED APPLICATIONS

This application claims priority to Japanese Patent Application No. 2006-194944 filed on Jul. 14, 2006, which is incorporated herein by reference in its entirety.

FIELD OF THE INVENTION

The present invention relates to a technique of generating a restored image from a blurred image based on an image restoration algorithm using a degradation function.

BACKGROUND OF THE INVENTION

Conventionally, a known image restoration algorithm restores a blurred image, in which degradations have occurred in the image imaged by an imaging apparatus such as a digital camera, due to being out of focus, hand movement, aberration and the like.

As the image restoration algorithm, for example, a known method represents image degradation due to blurring on the captured image with a degradation function (point spread function (PSF)), and restores it to an image having no blurring based on the degradation function.

Image restoration algorithms using the degradation function are known including, for example, the Wiener filter, the general inverse filter, the projection filter and the like. Japanese Patent Laid-Open Publication No. 2004-205802 discloses an image restoration method using the Wiener filter, and Japanese Patent Laid-Open Publication No. 2004-288653 discloses an image restoration method using the general inverse filter.

Here, the degradation function used by the method of restoring the blurred image will be described.

When f(x,y) is an ideal image and g(x,y) is the blurred image, it is assumed that there is a relation as follows:

[Formula 1]

$$g(x,y)=\iint h(x,y,x',y')f(x',y')dx'dy'+v(x,y) \quad (1)$$

Here, h(x,y,x',y') represents the degradation function, and v(x,y) represents random noise in an output image.

Except for the parallel translation, if an image having a blurred point does not depend on a position of the point, the degradation function becomes h(x−x',y−y') and the expression (1) becomes as follows:

[Formula 2]

$$g(x,y)=\iint h(x-x',y-y')f(x',y')dx'dy'+v(x,y) \quad (2)$$

When there is no noise, the Fourier transformation is performed on both sides of the expression (2) and it becomes as follows according to the convolution theorem:

$$G(u,v)=H(u,v)F(u,v) \quad (3)$$

G(u,v), F(u,v) and H(u,v) represent the Fourier transformations of g(x,y), f(x,y) and h(x,y), respectively. Here, H(u,v) is a transfer function of a system for transforming the ideal image f(x,y) into the blurred image g(x,y).

Now, in order to consider only the degradation due to the relative movement of the camera and the landscape, its degradation model will be described below. If the relative movement approximately equals that caused by the movement of an imaging area of an image sensor in a plane, the total of exposures at a point on the imaging area is obtained by integrating instantaneous exposures only when a shutter is opened. In this case, it is assumed that the time required for opening and closing the shutter can be ignored. When α(t) and β(t) are components of X and y directions of a displacement respectively, it becomes as follows:

[Formula 3]

$$g(x,y)=\int_{-T/2}^{T/2} f(x-\alpha(t),y-\beta(t))dt \quad (4)$$

In this case, T is an exposure time, which is assumed to be from −T/2 to T/2 for descriptive purposes. If the Fourier transformation is performed on both sides of the expression (4), it becomes as follows:

[Formula 4]

$$G(u,v) = \int dx \int dy \exp[-j2\pi(ux+vy)]$$
$$\int_{-T/2}^{T/2} dt f(x-\alpha(t), y-\beta(t))$$
$$= \int_{-T/2}^{T/2} dt \int dx \int dy f(x-\alpha(t), y-\beta(t))\exp[-j2\pi(ux+vy)]$$

If x−α(t)=ξ and y−β(t)=η, the above expression becomes as follows:

[Formula 5]

$$G(u,v) = \int_{-T/2}^{T/2} dt \int\int d\xi d\eta f(\xi,\eta) \times \exp \quad (5)$$
$$[-j2\pi(u\xi+v\eta)]\exp[-j2\pi(\alpha(t)u+\beta(t)v)]$$
$$= F(u,v)\int_{-T/2}^{T/2} \exp[-j2\pi(u\alpha(t)+v\beta(t))]dt$$
$$= F(u,v)H(u,v)$$

From this expression (5), it can be seen that the degradation is modeled with the expression (3) or the expression (2) which is equal to the expression (3). Then, the degradation function H(u,v) is given by the following expression:

[Formula 6]

$$H(u,v)=\int_{-T/2}^{T/2}\exp[-2j\pi(u\alpha(t)+v\beta(t))]dt \quad (6)$$

Therefore, the degradation function in the case of blurring with regard to the X-axis at an angle θ, at a certain speed V and only in the time T is given as follows:

$$H(u,v)=\sin \pi\omega T/\pi\omega \quad (7)$$

Here, ω is as follows:

$$\omega=(u-u0)V\cos\theta+(v-v0)V\sin\theta \quad (8)$$

u0 and v0 are central coordinates of the image. It should be noted that when ω is very small, the degradation function approximates to H(u,v)=T.

As the image restoration algorithm using the degradation function H obtained in this way, some methods have been proposed including a method of performing the Fourier transformation with regard to the blurred image and performing an operation in a frequency space, or a method of performing an iterative computation with a steepest descent method with regard to the image in a real space, and the like.

Here, the method of performing the Fourier transformation with regard to the blurred image and performing the operation in the frequency space will be described.

In other words, it is assumed that the blurred image g(x,y) and the original image f(x,y) are in accordance with the model of the above described expression (2). Then, if there is no noise, the Fourier transformations of g(x,y), f(x,y), and the blurred image H, h(x,y) satisfy the above described expression (3). Here, the expression (3) is transformed as follows:

$$F(u,v)=G(u,v)/H(u,v) \quad (9)$$

From this expression (9), if H(u,v) is known, it is possible to restore f(x,y) by multiplying the Fourier transformation of the blurred image G(u,v) with 1/H(u,v) to perform the inverse Fourier transformation.

Also, as the other method, the method of performing the image restoration by using the iterative computation with the steepest descent method will be described by using FIG. 18.

FIG. 18 is a flowchart showing a processing procedure of an image restoration processing apparatus for performing the image restoration by using the iterative computation with the steepest descent method.

In FIG. 18, the image restoration processing apparatus sets the blurred image g(x,y) as the 0th restored image (that is, initial image) in a RAM (S10). Next, a parameter n indicating an iteration count is initialized to 0, and further a maximum iteration count $n_{MAX}$ is read from a ROM (S12), and a predetermined convergence parameter ε is read from the ROM (S14). Also, a threshold Thr is read from the ROM as an end determination parameter (S16). Next, if the iteration count n is less than a predetermined maximum iteration count (a determination result at step S18 is positive "Y"), after the iteration count n is incremented (S20), ∇J (nabula) is calculated (S22), and a square of norm of ∇J is calculated to be set as a parameter t (S24).

Here, J is an evaluation amount of the general inverse filter and given as follows with the blurred image g(x,y), the restored image f(x,y) and the degradation function h(x,y):

$$J=\|g(x,y)-h(x,y)*f(x,y)\|^2$$

(* indicates a convolution integral). The above expression means that the evaluation amount J is given by the size of a difference between the image h(x,y)*f(x,y) obtained by causing the degradation function h(x,y) to operate on the restored image f(x,y), and the actual blurred image g(x,y). If the restored image has been correctly restored, h(x,y)*f(x,y)=g(x,y) and the evaluation amount is 0, in theory. It is assumed that the lower the evaluation amount J is, the better the restored image f(x,y) has been restored. In the steepest descent method, the iterative computation is repeated until the size of ∇J which is a gradient of this evaluation amount J, that is, the square of norm of ∇J becomes smaller than or equal to the threshold, and when it becomes smaller than or equal to the threshold, the iterative computation is finished and the restored image f(x,y) is obtained. It should be noted that although the case of the general inverse filter has been illustrated for the evaluation amount J, it is of course applicable to arbitrary evaluation amounts for evaluating the difference between g(x,y) and h(x,y)*f(x,y), also including the evaluation amounts in the Tiknohov-Miller normalization method and the Bayes restoration method for calculating the difference between g(x,y) and h(x,y)*f(x,y).

Now returning to FIG. 18, the image restoration processing apparatus determines whether or not t exceeds the threshold Thr (S26). If t exceeds the threshold Thr, since the restoration is regarded as still insufficient, ∇J is multiplied by the convergence parameter ε (S28), and a new restored image is generated by subtracting ε∇J from the restored image (S30). The process of step S18 to step S30 is iterated until t becomes less than or equal to the threshold Thr.

If t becomes less than or equal to the threshold Thr (the determination result at step S26 is positive "Y"), or even if t does not become less than or equal to the threshold Thr, if the maximum iteration count has been reached (the determination result at step S18 is negative "N"), the process is terminated.

The above described method is the method of performing the image restoration by using the iterative computation with the steepest descent method.

It should be noted that the principle of the image restoration process involving the iterative computation is described, for example, in Non-patent Document 1 (see M. Elad and A. Feuer; Super-Resolution of An Image Sequence—Adaptive Filtering Approach; Technion—Israel Institute of Technology, 4 Apr. 1997).

SUMMARY OF THE INVENTION

Generally, it requires a large amount computing processing power to obtain the restored image by using the image restoration algorithm as described above.

It is an advantage of the present invention to provide an image processing apparatus which performs the image restoration as necessary while the burden of the computing process based on the image restoration algorithm is reduced.

An image processing apparatus according to the present invention is characterized by including an image separation section for separating a plurality of color component images forming a blurred image which is captured in accordance with a contribution level to a brightness component into a first image and a second image having a smaller contribution level to the brightness component than the first image, an image restoration processing section for performing an image restoration process with regard to at least the first image based on a predetermined image restoration algorithm by using a PSF image representing a point spread function which is defined by an image capturing condition, and a restored image generating section for generating a restored image corresponding to the blurred image based on the first image having been subjected to the image restoration process and the second image.

According to one aspect of the image processing apparatus according to the present invention, the image restoration processing section performs the image restoration process also with regard to the second image based on the image restoration algorithm if a size of the PSF image is larger than a predetermined size.

According to one aspect of the image processing apparatus according to the present invention, the image restoration algorithm is an algorithm including an iterative computation using the PSF image, and a count of the iterative computation performed with regard to the second image by the image restoration processing section is less than a count of the iterative computation performed with regard to the first image.

According to one aspect of the image processing apparatus according to the present invention, it is characterized by including an image separation section for separating a plurality of color component images forming a blurred image which is captured in accordance with a contribution level to a brightness component into a first image and a second image having a smaller contribution level to the brightness component than the first image, an image restoration processing section for performing an image restoration process with regard to the first image and the second image based on a predetermined image restoration algorithm including an iterative computation by using a PSF image representing a point spread function which is defined by an image capturing condition, so that a count of the iterative computation with regard to the second image is less than a count of the iterative computation with regard to the first image, and a restored image generating section for generating a restored image corresponding to the blurred image based on the first image and the second image having been subjected to the image restoration process.

According to one aspect of the image processing apparatus according to the present invention, the image restoration processing section makes a maximum iteration count of the iterative computation performed with regard to the second image less than a maximum iteration count of the iterative computation performed with regard to the first image.

According to one aspect of the image processing apparatus according to the present invention, the image restoration algorithm is an algorithm using the iterative computation with a steepest descent method, in which if the blurred image is G, the restored image is F and the PSF image is H, the image restoration process is performed by calculating an evaluation value J based on a size of a difference between an image HF obtained by causing the PSF image H to operate on the restored image F, and the blurred image G, and iteratively performing a process of calculating the restored image F and a process of calculating the evaluation value J until a size of a gradient of the evaluation value J becomes smaller than or equal to a threshold, and the threshold with regard to the second image is larger than the threshold with regard to the first image.

According to one aspect of the image processing apparatus according to the present invention, the image restoration processing section extracts an edge portion from the second image and performs the image restoration process with regard to the extracted edge portion, and the restored image generating section generates the restored image corresponding to the blurred image based on the first image having been subjected to the image restoration process and the second image having been subjected to the image restoration process with regard to the edge portion.

According to one aspect of the image processing apparatus according to the present invention, the image restoration processing section performs a resolution conversion on the second image so that a resolution of the second image becomes lower than a resolution of the first image, and performs the image restoration process with regard to the second image having been subjected to the resolution conversion, and the restored image generating section generates the restored image corresponding to the blurred image based on the first image having been subjected to the image restoration process and the second image having been subjected to the image restoration process after the resolution conversion.

According to one aspect of the image processing apparatus according to the present invention, the image restoration processing section corrects the PSF image so that a center of gravity of the PSF image is located at a center of a particular pixel forming the PSF image, and uses the corrected PSF image to perform the image restoration process.

According to one aspect of the image processing apparatus according to the present invention, it is characterized by further including a pixel interpolation section for performing only a pixel interpolation which is a linear interpolation with regard to the blurred image before the image restoration processing section performs the image restoration process.

According to one aspect of the image processing apparatus according to the present invention, the first image is a G component image, and the second image is an R component image and a B component image.

According to one aspect of the image processing apparatus according to the present invention, it is characterized in that the first image is a brightness component image, and the second image is a color difference component image.

According to the present invention, it is possible to perform the image restoration as necessary while the burden of the computing process based on the image restoration algorithm is reduced.

BRIEF DESCRIPTION OF THE DRAWINGS

Preferred embodiments of the present invention will be described in detail based on the following figures, wherein:

FIG. 3B is a flowchart showing a processing procedure of the image processing section in this embodiment;

FIG. 4 is a flowchart showing a procedure of calculating a degradation function (PSF image);

FIG. 6B is a flowchart showing a processing procedure of the image processing section in the first variation;

FIG. 7 is a functional block diagram for illustrating the image restoration processing section in the first variation;

FIG. 8B is a flowchart showing the processing procedure of the image processing section in the second variation;

FIG. 9 is a diagram showing functional blocks for illustrating the image restoration processing section in the second variation;

DESCRIPTION OF PREFERRED EMBODIMENTS

The best mode for carrying out the present invention (hereinafter referred to as "embodiment") will be described below by using the drawings.

Figure 1:
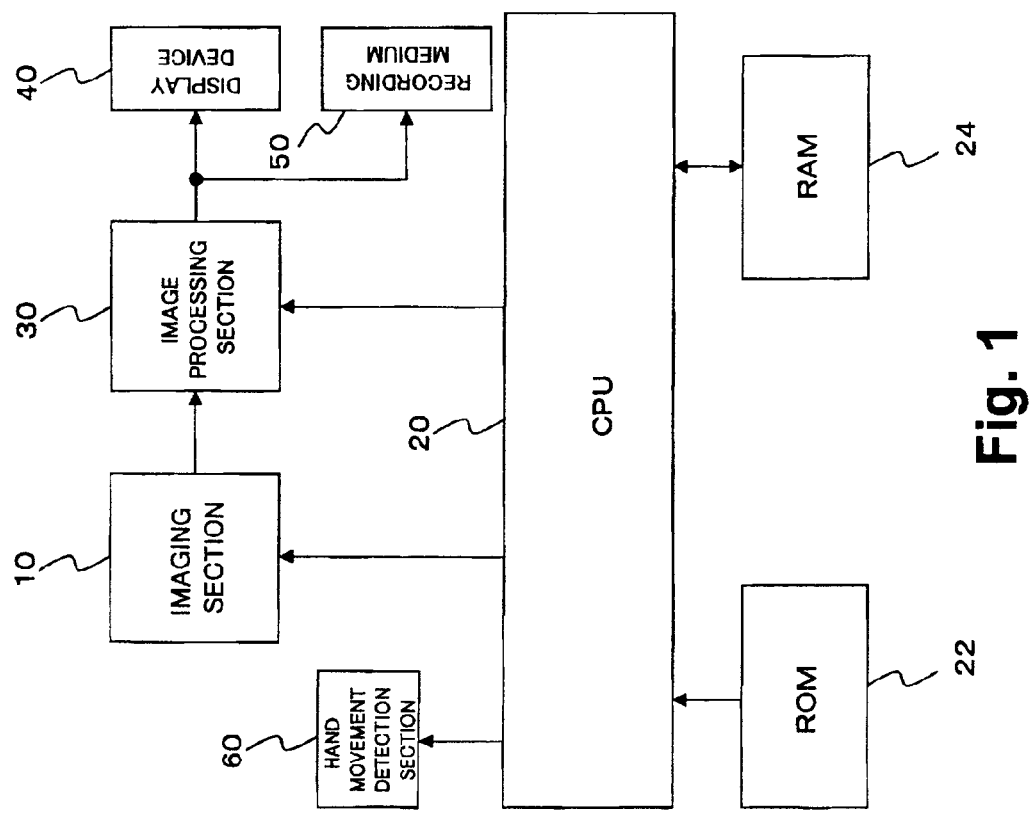
FIG. 1 is a diagram showing functional blocks of a digital camera according to this embodiment.

FIG. 1 is a diagram showing functional blocks of a digital camera according to this embodiment. It should be noted that although this embodiment will be described with a consumer digital camera as an example of an image processing apparatus, this embodiment is also applicable to cameras for other uses, such as a surveillance camera, a television camera, an endoscopic camera and the like, or devices other than cameras, such as a microscope, binoculars, and further a diagnostic imaging apparatus for NMR imaging and the like.

Figure 2:
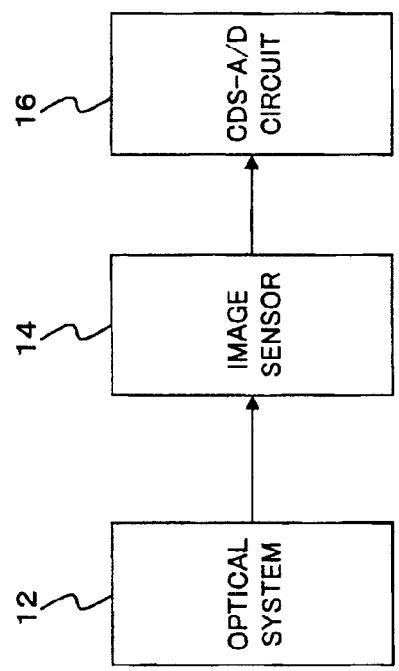
FIG. 2 is a diagram showing functional blocks for illustrating an imaging section in this embodiment.

In FIG. 1, under the control of a CPU 20, an imaging section 10 receives light from a subject and outputs RAW data corresponding to the received light. As shown in FIG. 2, the imaging section 10 includes an optical system 12, an image sensor 14 and a CDS (Correlated Double Sampling)-A/D (Analog/Digital) circuit 16.

The image sensor 14 is provided with a color filter, in which a red color filter (R), a green color filter of an R column (Gr), a blue color filter (B), and a green color filter of a B column (Gb) are arranged in a Bayer array. The image sensor 14 outputs an R signal which is a signal of a pixel of the red color filter (R), a Gr signal which is a signal of a pixel of the green color filter of the R column (Gr), a B signal which is a signal of a pixel of the blue color filter (B), and a Gb signal which is a signal of a pixel of the green color filter of the B column (Gb). Hereinafter, the R signal, the Gr signal, the B signal and the Gb signal are collectively referred to as the RAW data. The CDS (Correlated Double Sampling)-A/D (Analog/Digital) circuit 16 reduces noise of the RAW data outputted from the image sensor 14 by correlated double sampling, and converts the RAW data from analog signals to digital signals.

The CPU 20 is a central processing unit for controlling the entire digital camera. The CPU 20 expands various programs and parameters stored in a ROM 22 into a RAM 24 to perform various operations. An image processing section 30 performs various image processes such as RGB interpolation, white balance and the like with regard to the RAW data, and outputs image data obtained as a result of the processes. A display device 40 displays a video based on the image data to function as a viewfinder for capturing images. Moreover, a recording medium 50 records the image data. A hand movement detection section 60 is provided with two angular speed sensors for detecting angular speeds around the X-axis and the Y-axis in vertical directions with respect to the Z-axis which is a light axis of the digital camera, and outputs angular speeds $d\theta x/dt$ and $d\theta y/dt$ around the X-axis and the Y-axis caused by a hand movement of a user when he captures the images.

Figure 3A:
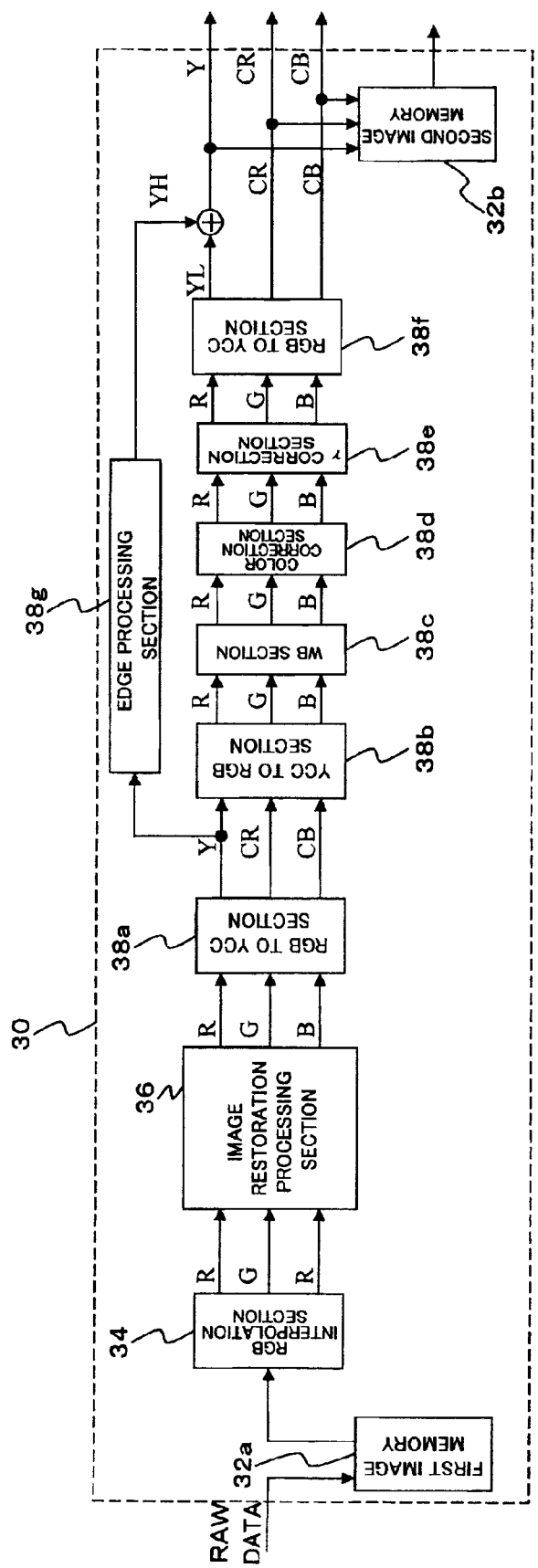
FIG. 3A is a diagram showing functional blocks for illustrating an image processing section in this embodiment.

FIG. 3A is a diagram showing more detailed functional blocks of the image processing section 30. Here, the image processing section 30 includes an image restoration processing section 36 for performing an image restoration process with regard to a blurred image having a degradation caused due to hand movement, based on a well known image restoration algorithm such as the general inverse filter and the like. It should be noted that if the image restoration algorithm such as the general inverse filter and the like is used, it is necessary to previously obtain a degradation function. In this case, the CPU 20 obtains the degradation function based on a flowchart shown in FIG. 4. In other words, the CPU 20 receives the angular speeds $d\theta x/dt$ and $d\theta y/dt$ inputted from the hand movement detection section 60 (S100), and calculates displacement angles of time-series $\theta x(t)$ and $\theta y(t)$ (S102). Furthermore, the CPU 20 calculates a displacement trace of blurring on the image sensor 14, based on a focal length of a lens obtained based on a zoom position at this point, an exposure time of the image capturing, and the displacement angles $\theta x$ and $\theta y$ (S104), and obtains the degradation function from the calculated blurring trace on the image sensor 14 (S106) and retains the degradation function in the RAM 24 (S108). In this way, the hand movement detection section 60 detects the hand movement on the image capturing as an image capturing condition, and the degradation function is determined. It should be noted that the degradation function is uniquely represented generally as a point spread function (PSF), as will be described below.

In the conventional image restoration process, if the image restoration is performed with regard to the blurred image, the image restoration process is performed uniformly with regard to respective color component images of R, G and B forming the blurred image, based on a predetermined image restoration algorithm. However, the image restoration processing section 36 in this embodiment performs the image restoration process with regard to the G component image among the color component images forming the blurred image, and does not perform the image restoration process with regard to the R component image and the B component image.

Hereinafter the various image processes performed by the image processing section 30 under the control of the CPU 20, with regard to the RAW data outputted from the CDS-AD circuit 16, will be described with reference to FIGS. 3A and 3B. It should be noted that FIG. 3B is a flowchart showing a processing procedure performed by the image processing section 30.

First, once the RAW data is recorded in a first image memory 32a (S200), the RAW data is sequentially played (S202) and inputted to an RGB interpolation section 34. The RGB interpolation section 34 performs a pixel interpolation with a well known pixel interpolation process with regard to the RAW data, and interpolates color components missing from the respective pixels forming the RAW data with reference to color components of peripheral pixels (S204). Furthermore, the RGB interpolation section 34 separates the respective color components included in the respective pixels, and generates and outputs the color component images for the respective components (S206). The color component images outputted from the RGB interpolation section 34 are inputted to the image restoration processing section 36, and the image restoration processing section 36 performs the image restoration process with regard to the respective color component images (S208).

Figure 5B:
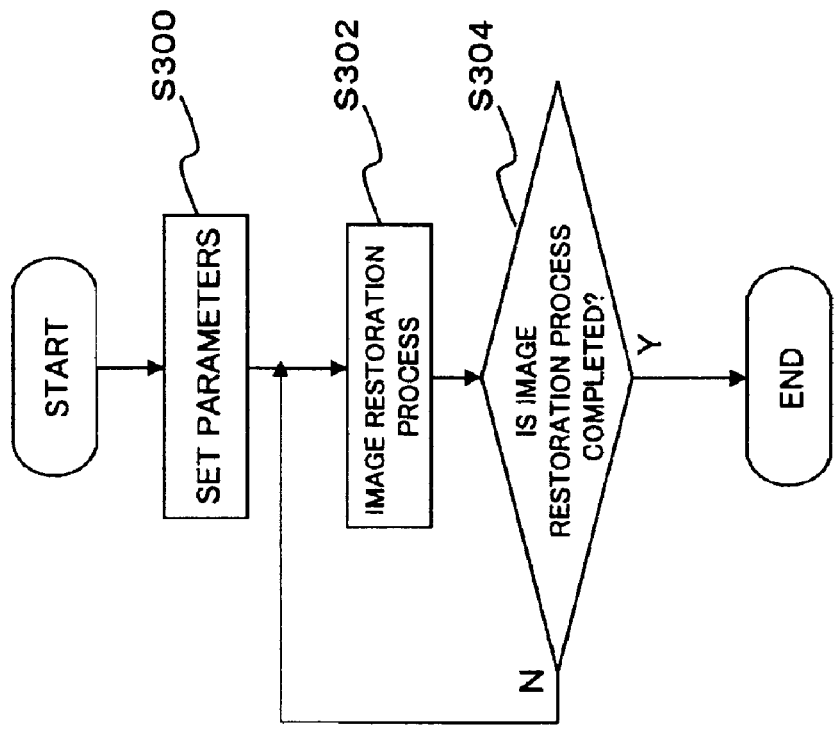
FIG. 5B is a flowchart showing a procedure of an image restoration process in the image restoration processing section in this embodiment.
Figure 5A:
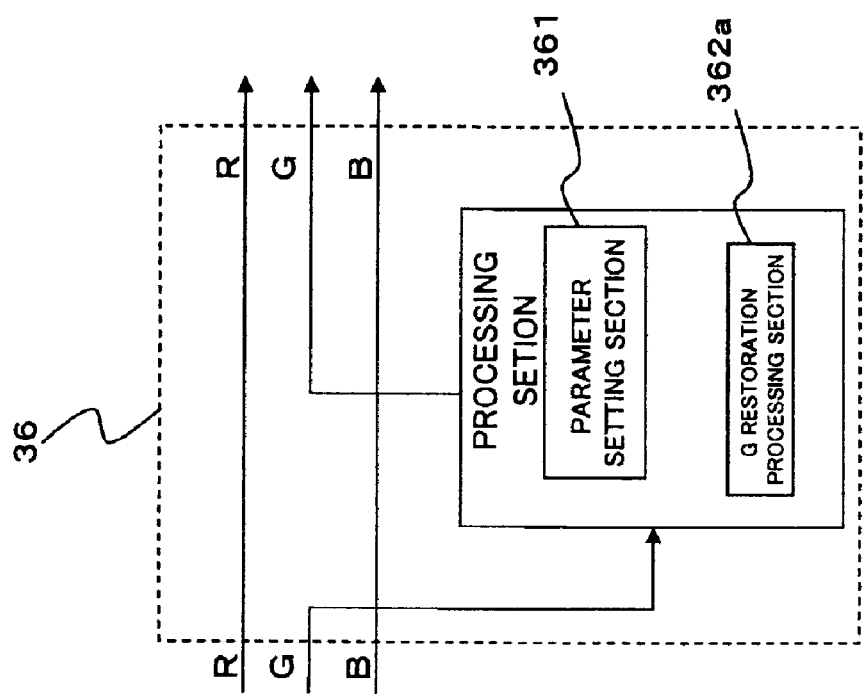
FIG. 5A is a diagram showing functional blocks for illustrating an image restoration processing section in this embodiment.

Here, the image restoration process performed by the image restoration processing section 36 will be further described. It should be noted that this embodiment uses the image restoration processing algorithm using the iterative computation with the steepest descent method described in FIG. 18, as the image restoration processing algorithm. FIG. 5A shows functional blocks for illustrating operations of the image restoration processing section 36 in this embodiment. FIG. 5B is a diagram showing a processing procedure of the image restoration process performed with regard to the G component image by the image restoration processing section 36. As described above, in this embodiment, the image restoration process is not performed with regard to the R and B component images. Thus, the image restoration processing section 36 outputs the R and B component images inputted from the RGB interpolation section 34 directly without performing the image restoration process. On the other hand, the image restoration processing section 36 performs the image restoration process with regard to the G component image.

Figure 18:
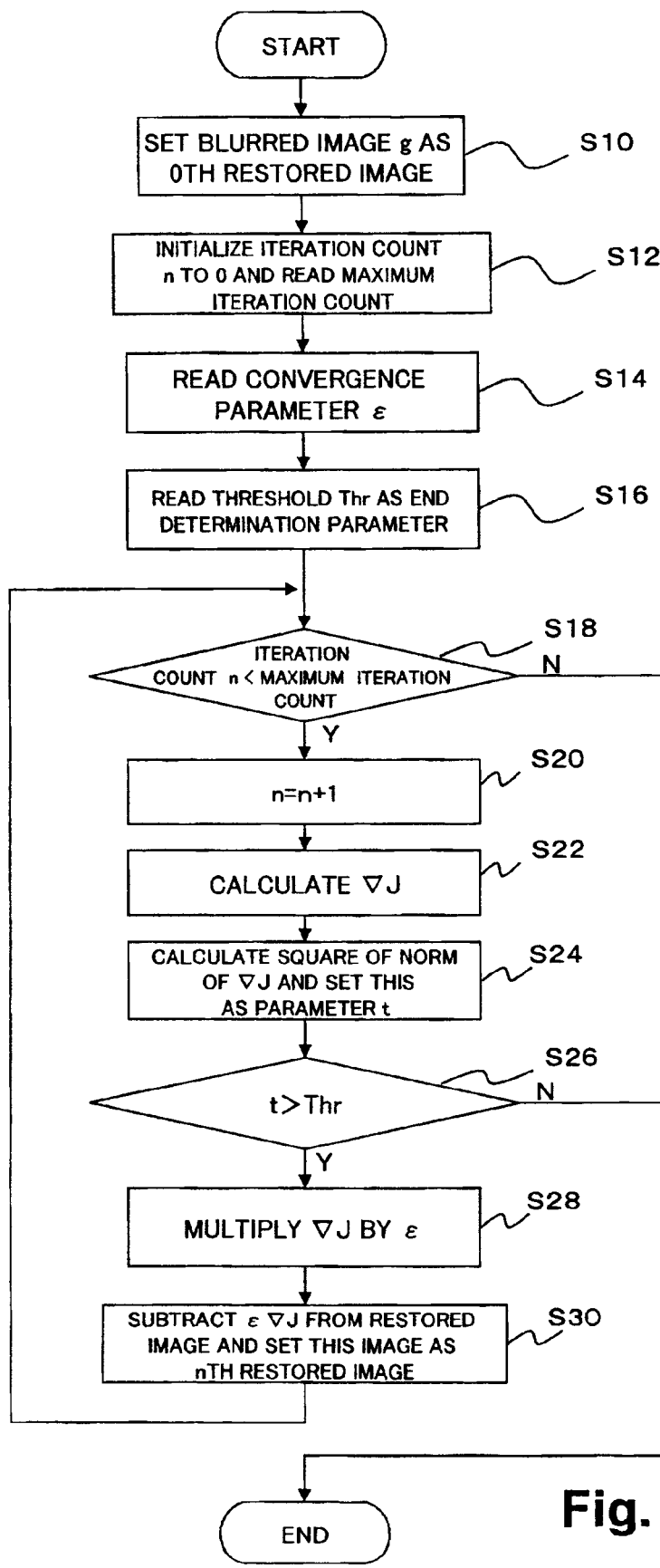
FIG. 18 is a flowchart showing a processing procedure of an image restoration processing apparatus for performing an image restoration by using an iterative computation with a steepest descent method.

In FIG. 5B, first the image restoration processing section 36 sets initial parameters required for the iterative computation in a parameter setting section 361 (S300). In other words, the parameter setting section 361 reads a maximum iteration count $n_{MAX}$, a convergence parameter $\epsilon$ and a threshold Thr from the ROM 22. Also, the parameter setting section 361 sets the G component image before being subjected to the restoration process as the 0th restored image, and sets an iteration count n to 0. Subsequently, the image restoration processing section 36 performs the image restoration process involving the iterative computation with regard to the G component image in a G restoration processing section 362a (S302). In other words, the process of steps S118 to S30 in FIG. 18 is iterated. Then, when the image restoration process is completed (a determination result at step S304 is positive Y), the image restoration processing section 36 outputs the G component image having been subjected to the restoration process. The above described process is the image restoration process performed by the image restoration processing section 36.

Now, returning to FIG. 3B, the G component image, the R component image and the B component image outputted from the image restoration processing section 36 are inputted to an RGB to YCC section 38a, and correction processes such as a white balance adjustment and the like are performed as shown below with regard to the respective color component images (S210).

In other words, the RGB to YCC section 38a converts the G component image, the R component image and the B component image into a brightness component image Y, a color difference component image CR and a color difference component image CB, and outputs them. The brightness component image Y, the color difference component image CR and the color difference component image CB are inputted to a YCC to RGB section 38b, and converted again into the R component image, the G component image and the B component image. The brightness component image Y is also inputted to an edge processing section 38g and subjected to an edge process. Then, the R component image, the G component image and the B component image are subjected to white balance adjustment at a WB section 38c, color correction at a color correction section 38d, and further γ correction at a γ correction section 38e, and then converted again into a brightness component image YL, the color difference component image CR and the color difference component image CB at an RGB to YCC section 38f. A brightness component image YH having been subjected to the edge process and outputted from the edge processing section 38g is added to the brightness component image YL. Then, once the brightness component image Y, the color difference component image CR and the color difference component image CB are recorded in a second image memory 32b (S212), they are compressed into JPEG and the like and recorded in the recording medium 50 as the image data of the restored image (S214). Alternatively, the brightness component image Y, the color difference component image CR and the color difference component image CB are synthesized and outputted to the display device 40 as the restored image to be displayed on a screen.

As described above, in this embodiment, among the respective color component images outputted from the RGB interpolation section 34, the image restoration process is performed only with regard to the G color component image based on the predetermined image restoration algorithm. Human eyes are very sensitive to the brightness component, and the G component contributes to the brightness component most among the respective color components of R, G and B. Consequently, according to this embodiment, by performing the image restoration process with priority given to the G component image, it is possible to downsize circuits related to the image restoration process, that is, downsize a gate size, and execute the image restoration process in a relatively short time compared to the case of performing the image restoration process with regard to all of the color component images. This may reduce electrical power consumption. Also according to this embodiment, the image restoration process uses only a small memory capacity. For example, this may increase the number of images captured serially.

Figure 6A:
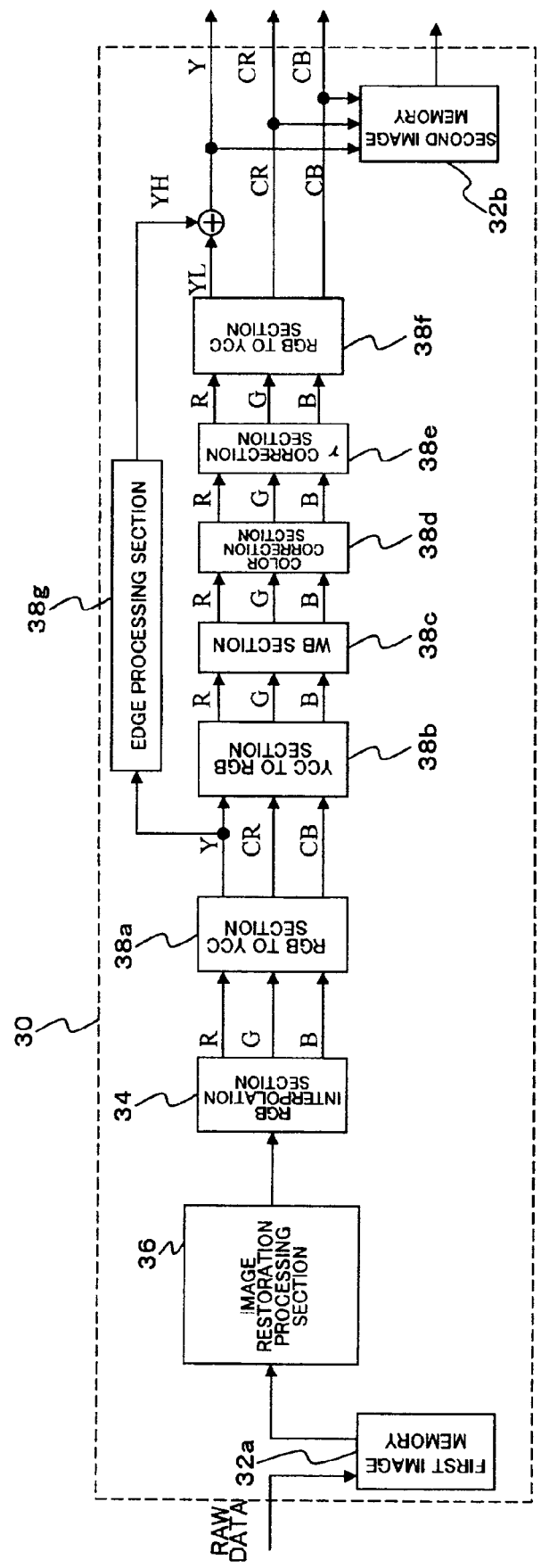
FIG. 6A is a diagram showing functional blocks for illustrating the image processing section in the first variation.

In the above described embodiment, the example of retrieving the G component included in each pixel forming the blurred image after the pixel interpolation and performing the image restoration process has been described. However, for example, as the first variation, a Gr component image and a Gb component image having the G component may be extracted from the RAW data before being subjected to the pixel interpolation, and the image restoration process may be performed only with regard to the Gr component image and the Gb component image based on the predetermined image restoration algorithm. FIG. 6A shows functional blocks of the image processing section 30 in the first variation. FIG. 6B is a flowchart showing a processing procedure of the image processing section 30 in the first variation. In the first variation, as shown in FIG. 6A, the image restoration processing section 36 is provided at a previous phase of the RGB interpolation section 34.

The processing procedure of the image processing section 30 in the first variation will be briefly described below with reference to FIG. 6B, mainly on different portions from the processing procedure of the image processing section 30 in the embodiment shown in FIG. 3B. In the first variation, the image processing section 30 performs the image restoration process with regard to the RAW data recorded in the first image memory (S204-1), performs the pixel interpolation with regard to the RAW data having been subjected to the image restoration process (S206-1), and generates the respective color component images (S208-1), and then various correction processes are performed similarly to the above described embodiment (S210-1).

FIG. 7 shows functional blocks of the image restoration processing section 36 in the first variation. As shown in FIG. 7, in the first variation, at a separation section 363, the RAW data is first separated into the Gr and Gb component images and the R and B component images, and the image restoration process is performed with regard to the Gr and Gb component images at a Gr and Gb restoration processing section 362b. It should be noted that the image restoration process performed at the Gr and Gb restoration processing section 362b may be similar to the restoration process performed at the G restoration processing section 362a. In other words, the Gr and Gb restoration processing section 362b performs the restoration process based on the flowchart shown in FIG. 5B. Then, the image restoration processing section 36 outputs the Gr and Gb component images having been subjected to the restoration process and the R and B component images not having been subjected to the restoration process together as the RAW data having been subjected to the restoration process.

Figure 8A:
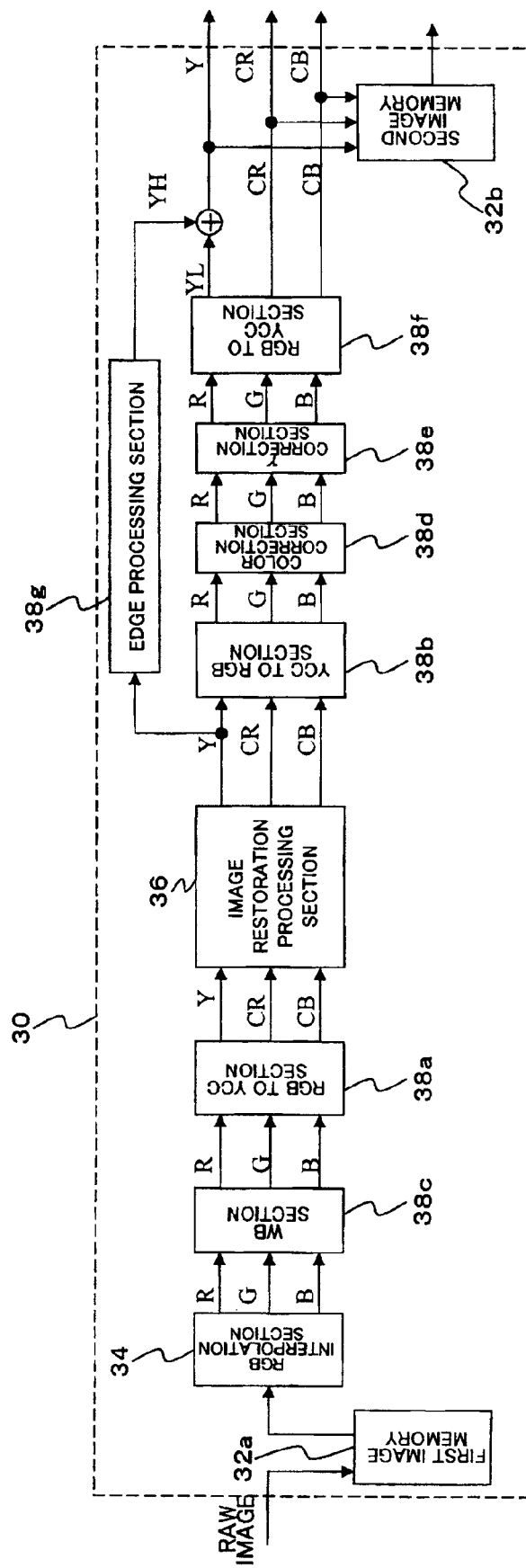
FIG. 8A is a diagram showing functional blocks for illustrating the image processing section in the second variation.

Moreover, as the second variation, the respective color component images obtained by performing the pixel interpolation on a RAW signal may be converted into the brightness component image Y and the color difference component images CR and CB, and then the image restoration process may be performed only with regard to the brightness component image Y. FIG. 8A shows functional blocks of the image processing section 30 in the second variation. FIG. 8B shows a processing procedure of the image processing section 30 in the second variation. In the second variation, the WB section 38c and the YCC to RGB section 38b are provided between the RGB interpolation section 34 and the image restoration processing section 36. As shown in FIG. 8B, in the second variation, the white balance adjustment is performed with regard to the respective color component images generated at the RGB interpolation section 34, the respective color component images are further converted into the brightness component image Y and the color difference component images CR and CB (S207-2), and then the image restoration process is performed (S208-2). It should be noted that in the above description, although the white balance adjustment is performed with regard to the respective color component images having been subjected to the pixel interpolation in order to improve the accuracy of the YCC conversion at the RGB to YCC section 38a, the white balance adjustment may be performed after the image restoration process.

FIG. 9 shows functional blocks of the image restoration processing section 36 in the second variation. As shown in FIG. 9, the image restoration processing section 36 performs the image restoration process with regard to the brightness component image Y at a Y restoration processing section 362c based on the flowchart shown in FIG. 5B.

In the above described embodiment and the like, the examples of performing the image restoration process only with regard to the G component image or the brightness component image Y have been described. However, for example, if the respective color component images are synthesized to generate the restored image after the image restoration has been performed only with regard to the G component image, a color drift occurs in the restored image and a sufficient image quality may not be obtained. Particularly, an edge portion is significantly affected by the color drift. Consequently, as the third variation, the image restoration process may be performed with regard to the edge portions of the R component image and the B component image.

Figure 10B:
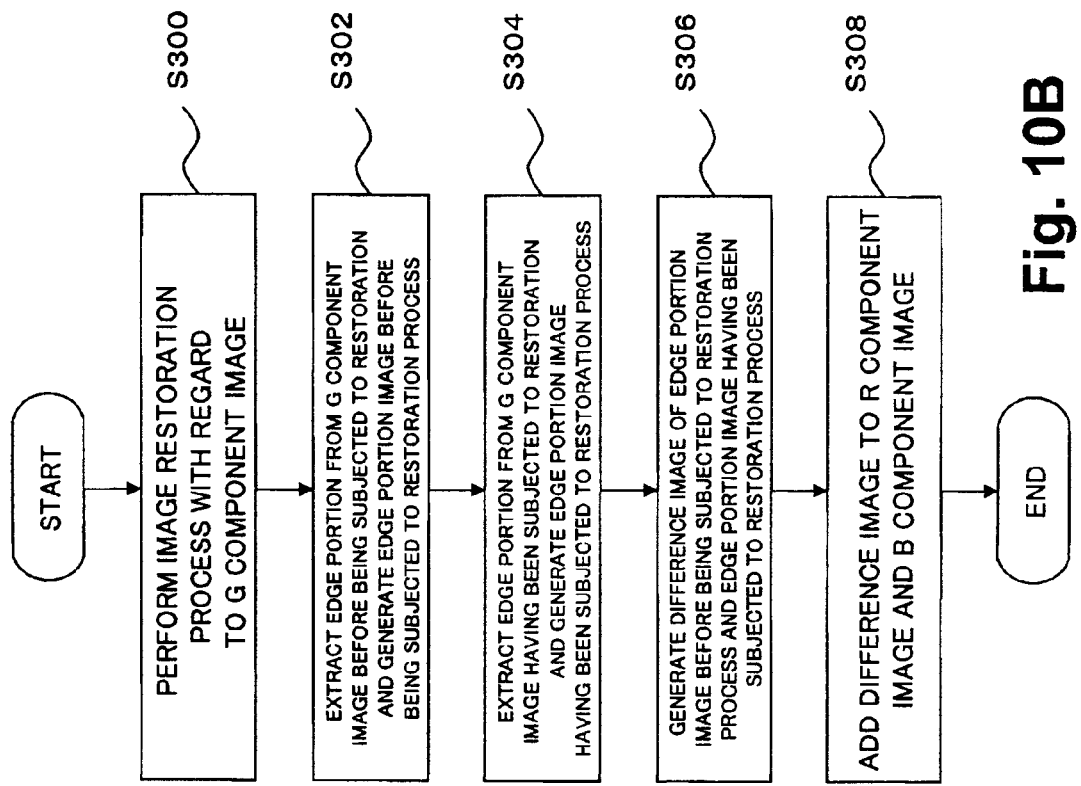
FIG. 10B is a flowchart showing a procedure of the image restoration process performed with regard to edge portions of an R component image and a B component image by the image restoration processing section in the third variation.
Figure 10A:
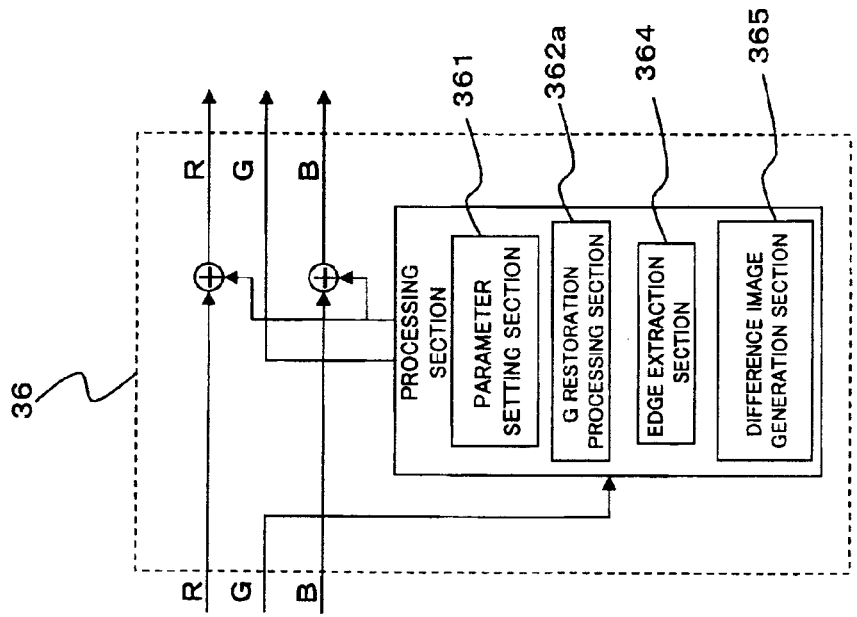
FIG. 10A is a diagram showing functional blocks for illustrating the image restoration processing section in the third variation.

FIG. 10A shows functional blocks of the image restoration processing section 36 in the third variation. FIG. 10B is a flowchart showing a procedure of the image restoration process performed with regard to the edge portions of the R component image and the B component image by the image restoration processing section 36 in the third variation.

With reference to FIG. 10B, the processing procedure of the image restoration processing section 36 in the third variation will be described below.

After the G restoration processing section 362a performs the image restoration process with regard to the G component image based on the flowchart shown in FIG. 5B (S300), an edge extraction section 364 extracts the edge portion from the G component image outputted from the RGB interpolation section 34, by using a filter and the like, and generates an edge portion image before being subjected to the restoration process (S302). The edge extraction section 364 further extracts the edge portion from the G component image having been subjected to the image restoration process, and generates the edge portion image having been subjected to the restoration process (S304). A difference image generation section 365 generates a difference image of the edge portion image before being subjected to the restoration process and the edge portion image having been subjected to the restoration process (S306). The image restoration processing section 36 performs the image restoration process with regard to the edge portions of the R component image and the B component image by adding the generated difference image to the R component image and the B component image (S308). It should be noted that even if the image restoration process is performed before the pixel interpolation, the image restoration process may be performed with regard to the edge portions of the R component image and the B component image.

Incidentally, if the image restoration process is performed only with regard to the G component image among the respective color component images forming the blurred image, the larger the amount of blurring on the blurred image, the larger the color drift becomes. Thus, if the blurring amount is large, the image restoration process is preferably performed also with regard to the R component image and the B component image.

Consequently, considering that the larger the blurring amount, the larger the size of the degradation function becomes, as the forth variation, if the degradation function is more than or equal to a predetermined value, the image restoration process may be performed also with regard to the R component image and the B component image. It should be noted that the size of the degradation function may be obtained as follows, for example.

In other words, the degradation function used for the image restoration process is generally represented as the image (PSF image). The PSF image will be described below before describing the fourth variation.

Figure 11A:
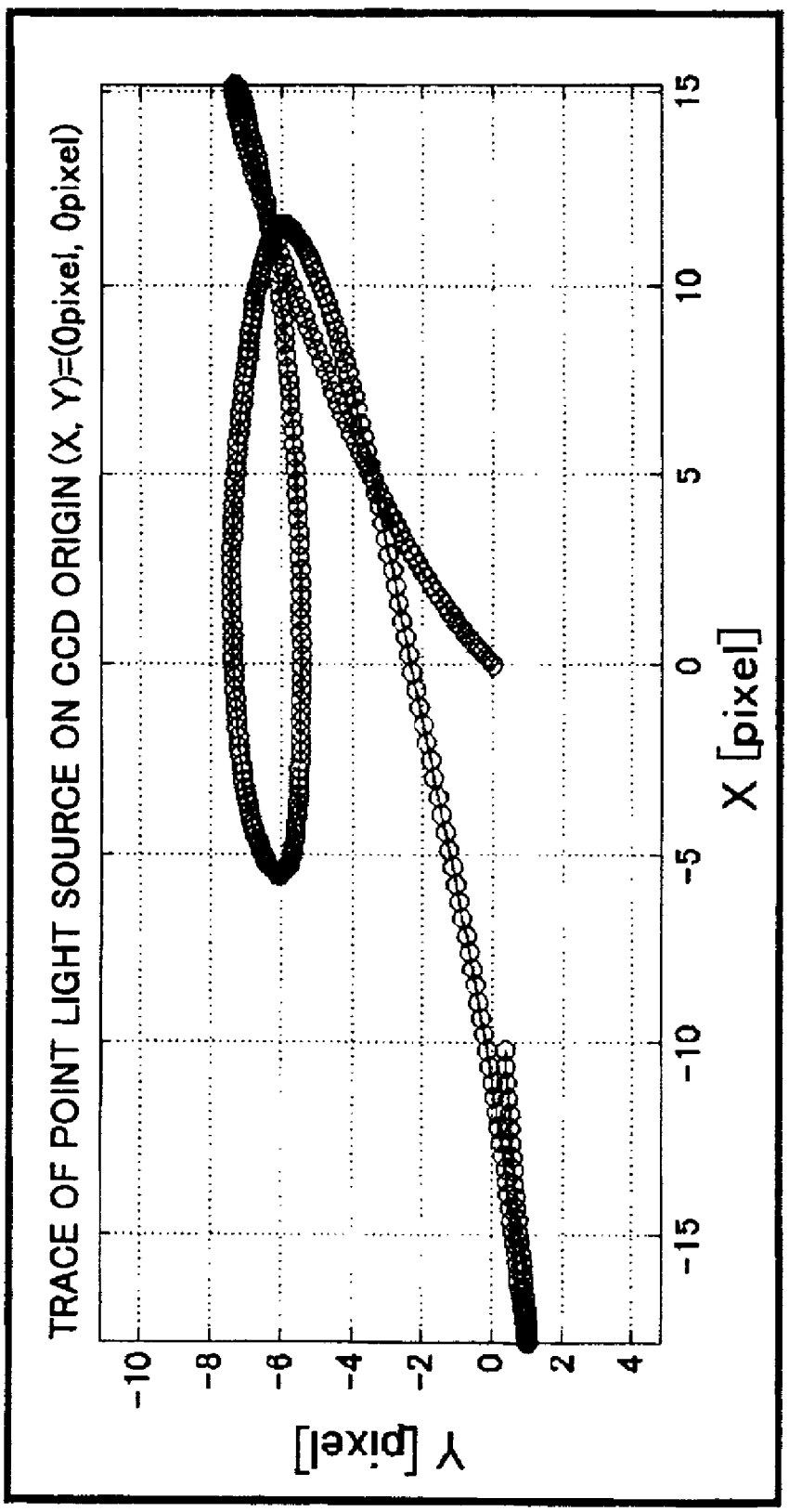
FIG. 11A is a diagram showing an example of a trace of a point light source on a CCD.
Figure 11B:
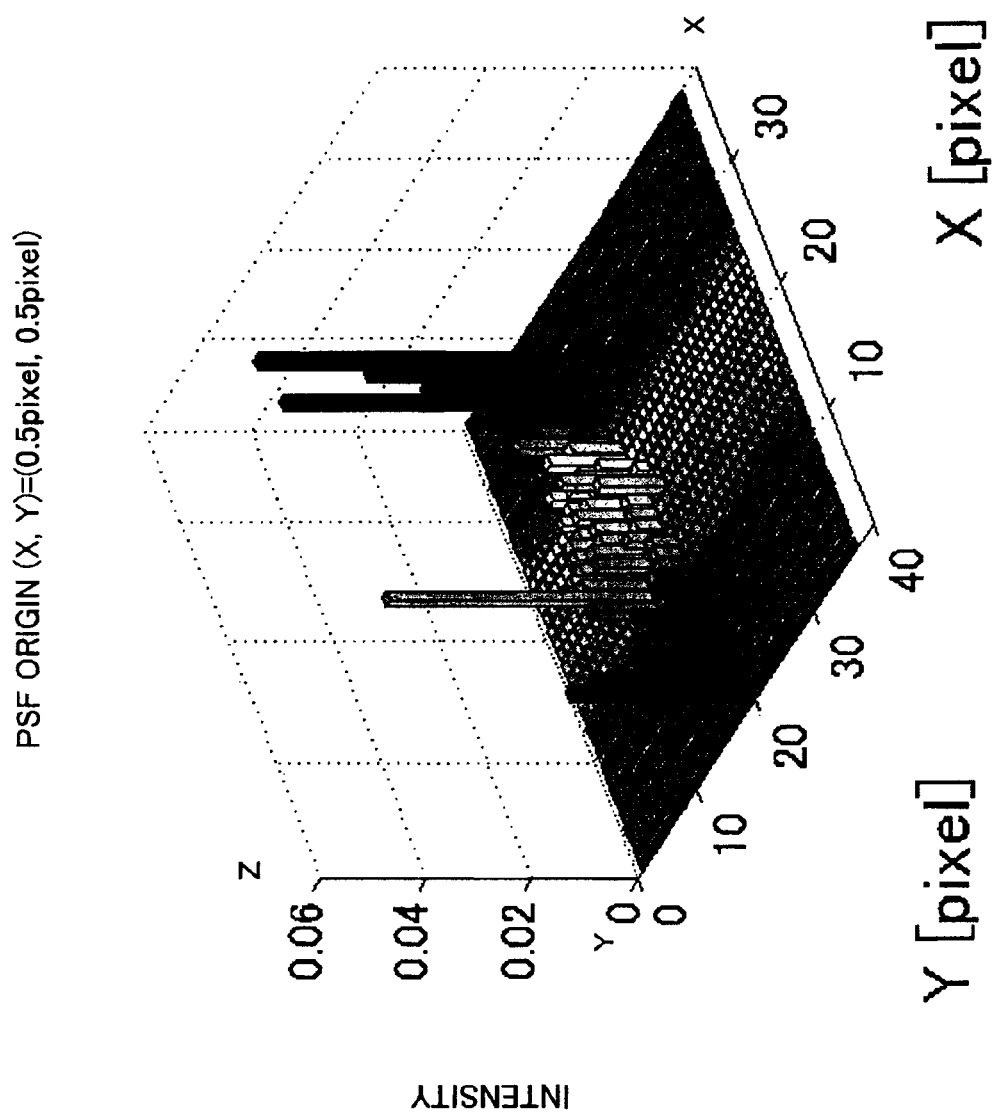
FIG. 11B is a diagram for illustrating the PSF image.

In this embodiment, the PSF image, that is, the degradation function, is obtained based on the blurring trace as shown in FIG. 4. FIG. 11A is a diagram showing an example of a trace of a point light source on a CCD (image sensor), that is, the blurring trace. FIG. 11B is an image diagram where the PSF image corresponding to the blurring trace shown in FIG. 11A is represented in three dimensions. In FIG. 11B, a Z-axis component indicates a brightness value (intensity) of each pixel. The brightness value of each pixel forming the PSF image is defined based on the blurring trace, and the pixel on the trace of the point light source has the brightness value of more than 0. The longer the time the point light source remains, the higher the brightness value becomes. Consequently, as a measure of the size of the degradation function, for example, the number of pixels having the brightness value of more than 0 may be used. In other words, the number of pixels having the brightness value of more than 0 is counted from the PSF image, and the size of the PSF image may be obtained from the counted number.

Figure 12B:
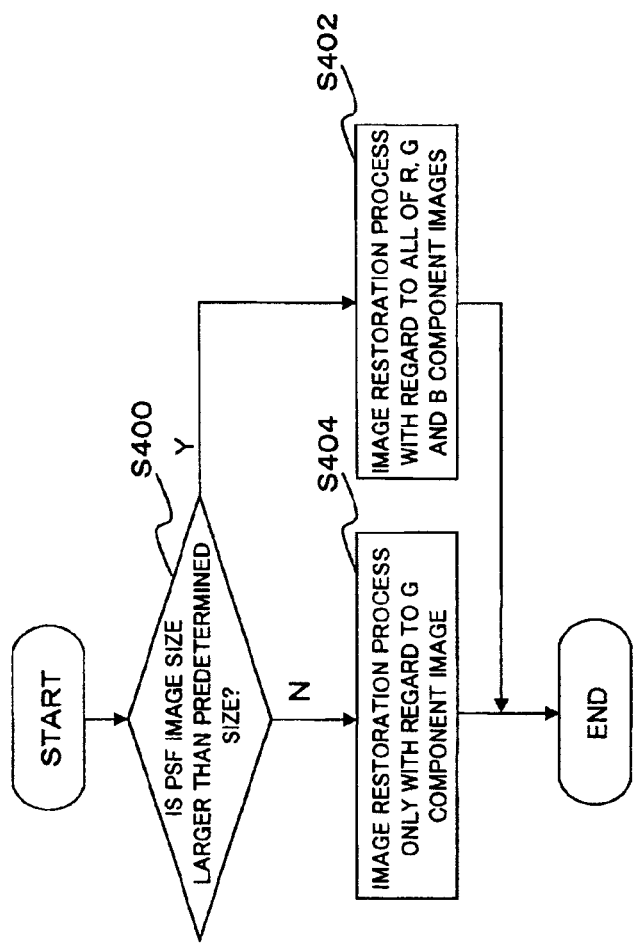
FIG. 12B is a flowchart showing a procedure of the image restoration process performed by the image restoration processing section in the fourth variation.
Figure 12A:
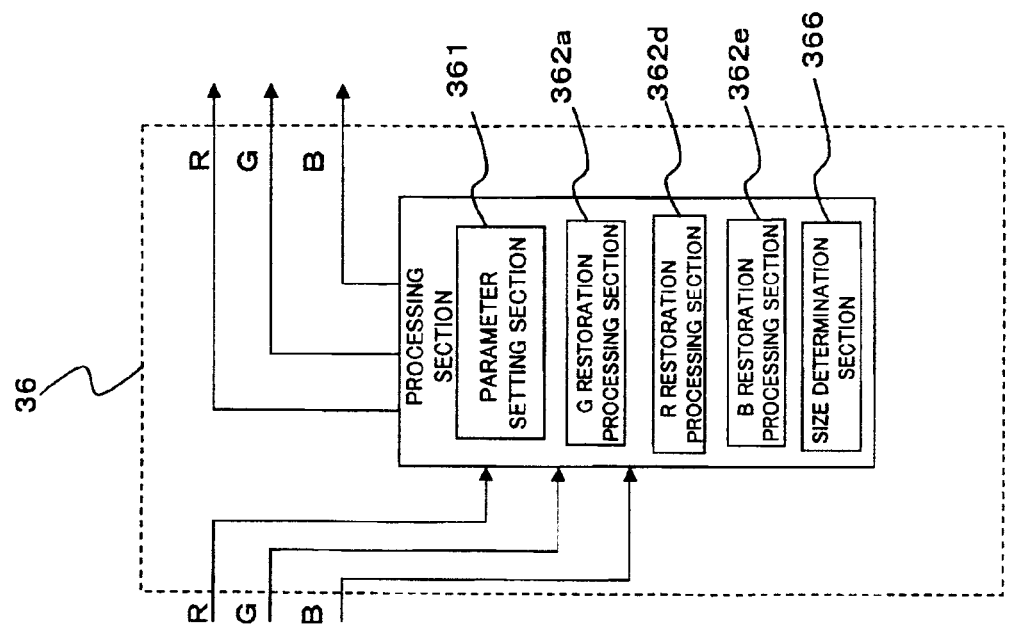
FIG. 12A is a diagram showing functional blocks for illustrating the image restoration processing section in the fourth variation.

Here, the fourth variation will be described. FIG. 12A shows functional blocks of the image restoration processing section 36 in the fourth variation. FIG. 12B shows a flowchart showing a processing procedure of the image restoration processing section 36 in the fourth variation.

In FIG. 12B, the image restoration processing section 36 determines whether or not the size of the degradation function is larger than a predetermined size at a size determination section 366 (S400). In other words, the size determination section 366 counts the number of pixels having the brightness value of more than 0 among an image group forming the PSF image, and determines whether or not the counted number is larger than a predetermined value. If the size of the degradation function is larger than the predetermined size (the determination result at step S400 is positive "Y"), the image restoration process is also performed with regard to the R component image and the B component image in addition to the G component image (S402). On the other hand, if the size of the degradation function is smaller than or equal to the predetermined size (the determination result at step S400 is negative "N"), the image restoration processing section 36 performs the image restoration process only with regard to the G component image (S404). This may keep the probability of causing the color drift in the restored image low.

Moreover, as the fifth variation, if the image restoration algorithm performed by the image restoration processing section 36 is the algorithm for performing the image restoration by using the iterative computation from the blurred image and the degradation function, various parameters such as an upper limit count of performing the iterative computation and the like may be changed for each color component image. In other words, in the image restoration process involving the iterative computation, the restoration process is performed first with regard to lower spatial frequency components among all spatial frequency components forming the image. Thus, it is less likely to cause a problem in the quality of the restored image even with the lower count of the iterative computation with regard to the R component image and the B component image including many relatively low spatial frequency components, than the G component image including many relatively high spatial frequency components.

Figure 13:
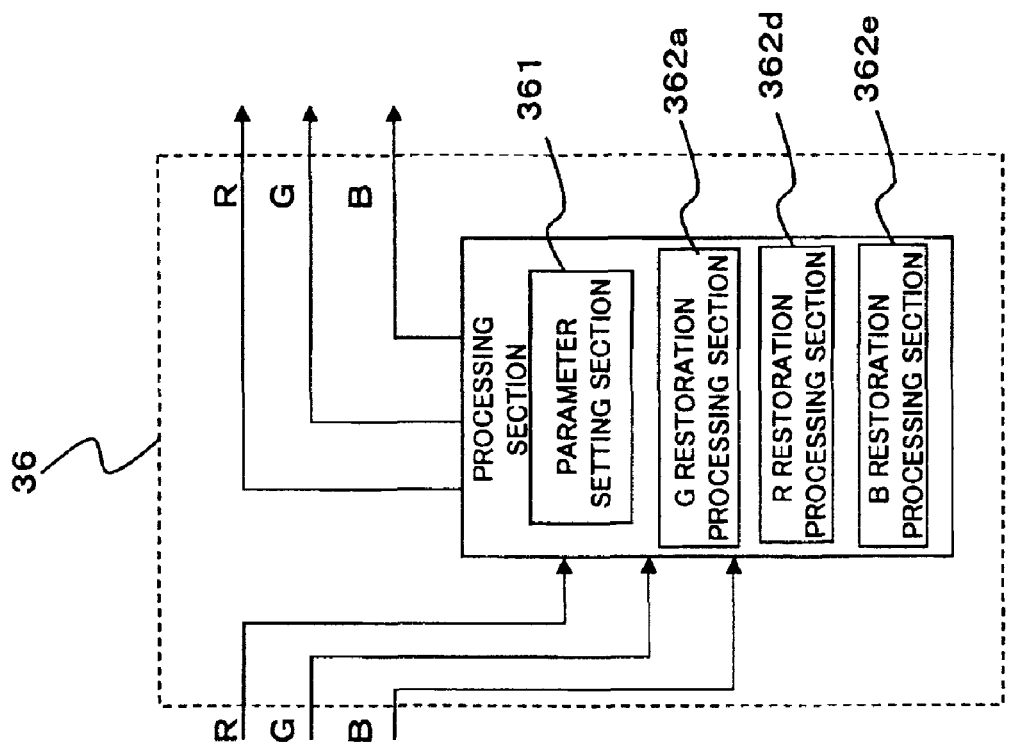
FIG. 13 is a diagram showing functional blocks for illustrating the image restoration processing section in the fifth variation.

Consequently, for example, if the image restoration processing section 36 performs the image restoration by using the iterative computation with the steepest descent method, the parameter setting section 361 sets the maximum iteration count with regard to the R component image and the B component image to less than the maximum iteration count with regard to the G component image. This may keep the iteration count with regard to the R component image and the B component image less than the iteration count with regard to the G component image. Alternatively, the threshold Thr with regard to the R component image and the B component image is set to larger than the threshold Thr with regard to the G component image. Since this raises the probability of the parameter t becoming less than or equal to the threshold Thr, the iteration count with regard to the R component image and the B component image may be kept less than the iteration count with regard to the G component image. Here, for example, the image restoration processing section 36 may perform the processing procedure shown in FIG. 18 in parallel for each color component image. FIG. 13 shows functional blocks of the image restoration processing section 36 in the fifth variation. In FIG. 13, the parameter setting section 361 sets the various parameters such as the maximum iteration count or the threshold Thr, which have been previously defined for each color component image, with regard to an R restoration processing section 362d, the G restoration processing section 362a and a B restoration processing section 362e. The G restoration processing section 362a, the R restoration processing section 362d and the B restoration processing section 362e use the respective parameters defined by the parameter setting section 361, with regard to the R component image, the G component image and the B component image respectively, to perform the image restoration process involving the iterative computation based on FIG. 18.

Figure 14B:
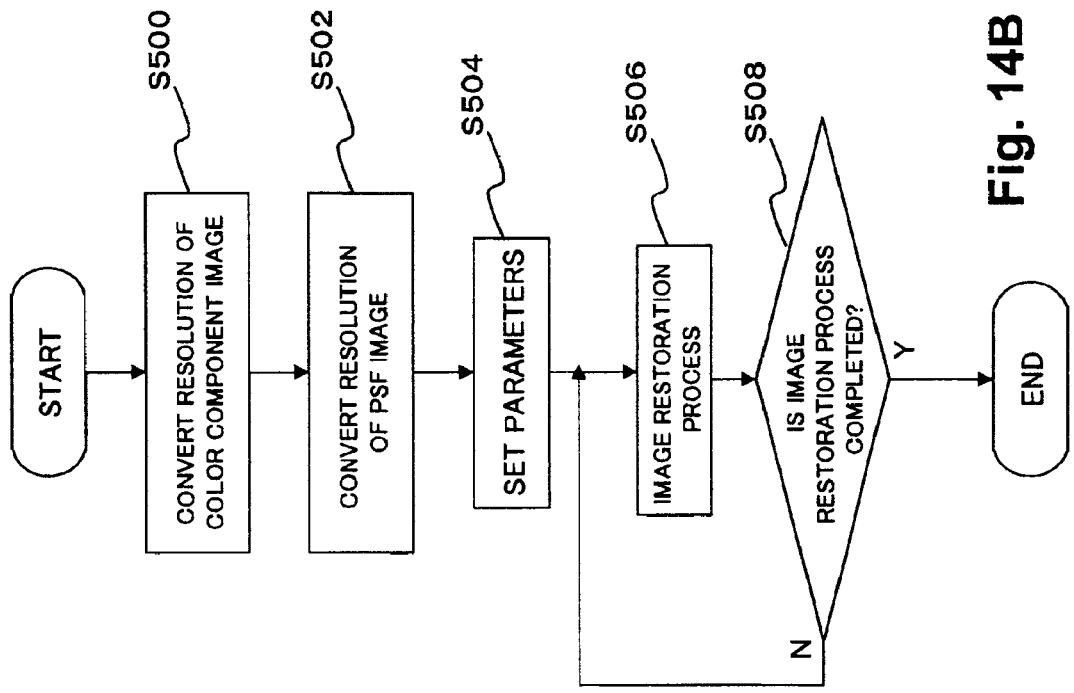
FIG. 14B is a flowchart showing a procedure of the image restoration process performed with regard to the R component image and the B component image by the image restoration processing section in the sixth variation.
Figure 14A:
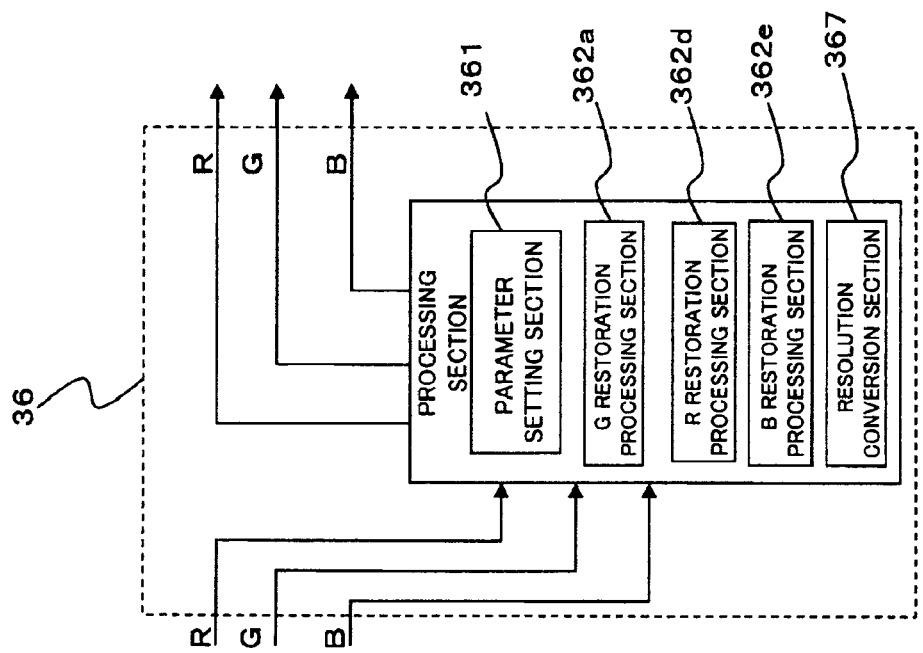
FIG. 14A is a diagram showing functional blocks for illustrating the image restoration processing section in the sixth variation.

Furthermore, as the sixth variation, the image restoration processing section 36 may perform the image restoration process with different resolutions for the respective color component images. FIG. 14A shows functional blocks of the image restoration processing section 36 in the sixth variation. FIG. 14B shows a procedure of the image restoration process performed with regard to the R and B component images by the image restoration processing section 36 in the sixth variation. As described above, the R and B component images include fewer high spatial frequency components in comparison with the G component image. Thus, it is less likely to cause a problem in the quality of the restored image even with the low resolution with regard to the R and B component images, in comparison with the G component image. Consequently, in the sixth variation, before performing the image restoration process with regard to the respective color component images, the image restoration processing section 36 converts the resolutions of the R and B component images so that they become lower than the resolution of the G component image, for example, to ¼, at a resolution conversion section 367 (S500). Moreover, the resolution conversion section 367 also converts the resolution of the PSF image, which is used in the case of performing the image restoration process with regard to the R and B component images, so that it becomes lower than the resolution of the PSF image with regard to the G component image, for example, to ¼ (S502). Then, the image restoration processing section 36 performs the image restoration process similarly to the above (S504 to S508). It should be noted that the resolution conversion section 367 returns the resolutions of the R and B component images to the original resolutions after the image restoration. In this way, the conversion of the resolutions of the R and B component images to be lower may reduce the time of the image restoration process and require a smaller memory capacity. It should be noted that the resolution conversion section 367 provided in the image restoration processing section 36 shown in FIG. 14A may be provided in the image restoration processing section 36 shown in FIG. 6A or FIG. 8A. If provided in the image restoration processing section 36 of FIG. 8A, the resolution conversion section 367 replaces the R and B component images with the CR and CB component images, and reduces the resolutions of the CR and CB component images.

Figure 15:
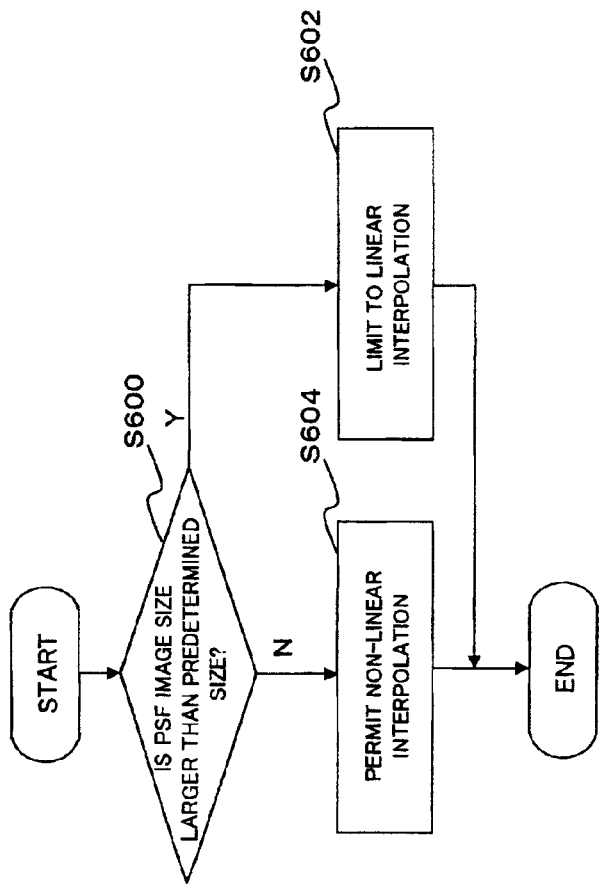
FIG. 15 is a flowchart showing a processing procedure of a pixel interpolation performed by an RGB interpolation section in the seventh variation.

Incidentally, for the pixel interpolation, a linear interpolation and a non-linear interpolation are generally known. On the other hand, the well known image restoration algorithm such as the general inverse filter is a linear process. Thus, if the process based on the image restoration algorithm of the linear process is performed with regard to the image having been subjected to the non-linear interpolation, the process takes time or the image restoration itself becomes difficult. Consequently, as the seventh variation, if the image restoration process is performed, the pixel interpolation process at the RGB interpolation section 34 may be limited to only the linear process. In this case, for example, as shown in FIG. 15, before performing the pixel interpolation process, the RGB interpolation section 34 determines whether or not the size of the PSF image is larger than a predetermined size (S600). If the size of the PSF image is larger than the predetermined size (the determination result at step S600 is positive "Y"), the RGB interpolation section 34 determines to perform the image restoration process, and performs the pixel interpolation limited to the linear process (S602). On the other hand, if the size of the PSF image is smaller than or equal to the predetermined size (the determination result at step S600 is negative "N"), the RGB interpolation section 34 performs the pixel interpolation ordinarily including the non-linear process (S604). This may reduce the time required for the image restoration process.

Also, as described above, if contents of the image restoration process are changed for each color component image, the color drift may occur in the restored image. This is caused by a phase shift caused in a spatial domain of each color component image due to the image restoration process using the PSF image (degradation function). This phase shift is caused by a center of gravity of the PSF image not being located at a center of a particular pixel forming the PSF image. Consequently, as the eighth variation, in order to decrease the color drift, the PSF image may be corrected so that the center of gravity of the PSF image is located at the center of the particular pixel, before performing the image restoration process.

A method of calculating the center of gravity of the PSF image and a method of correcting the PSF image will be described below with FIGS. 16A and 16B.

Figure 16A:
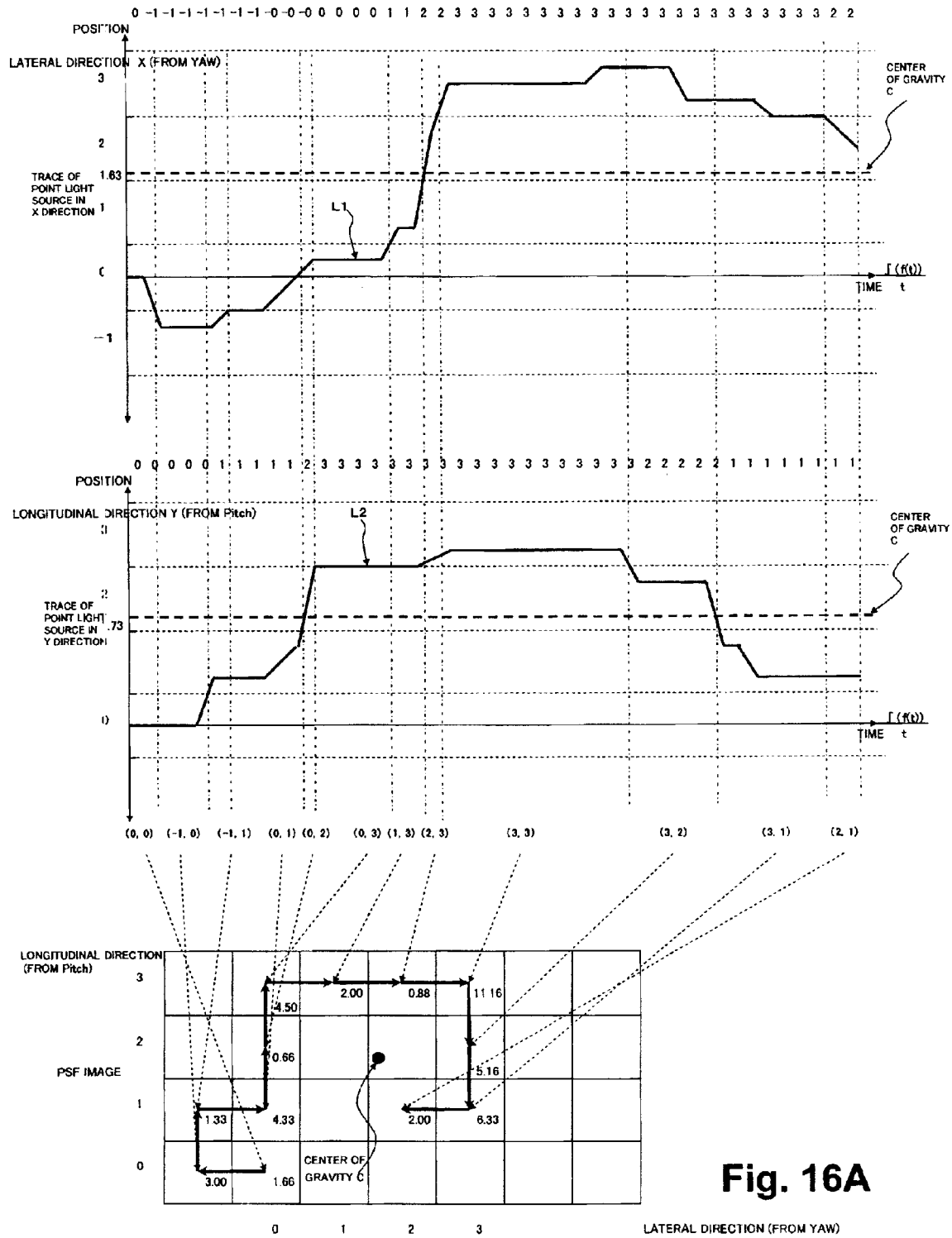
FIG. 16A is a diagram for illustrating a center of gravity of the PSF image.
Figure 16B:
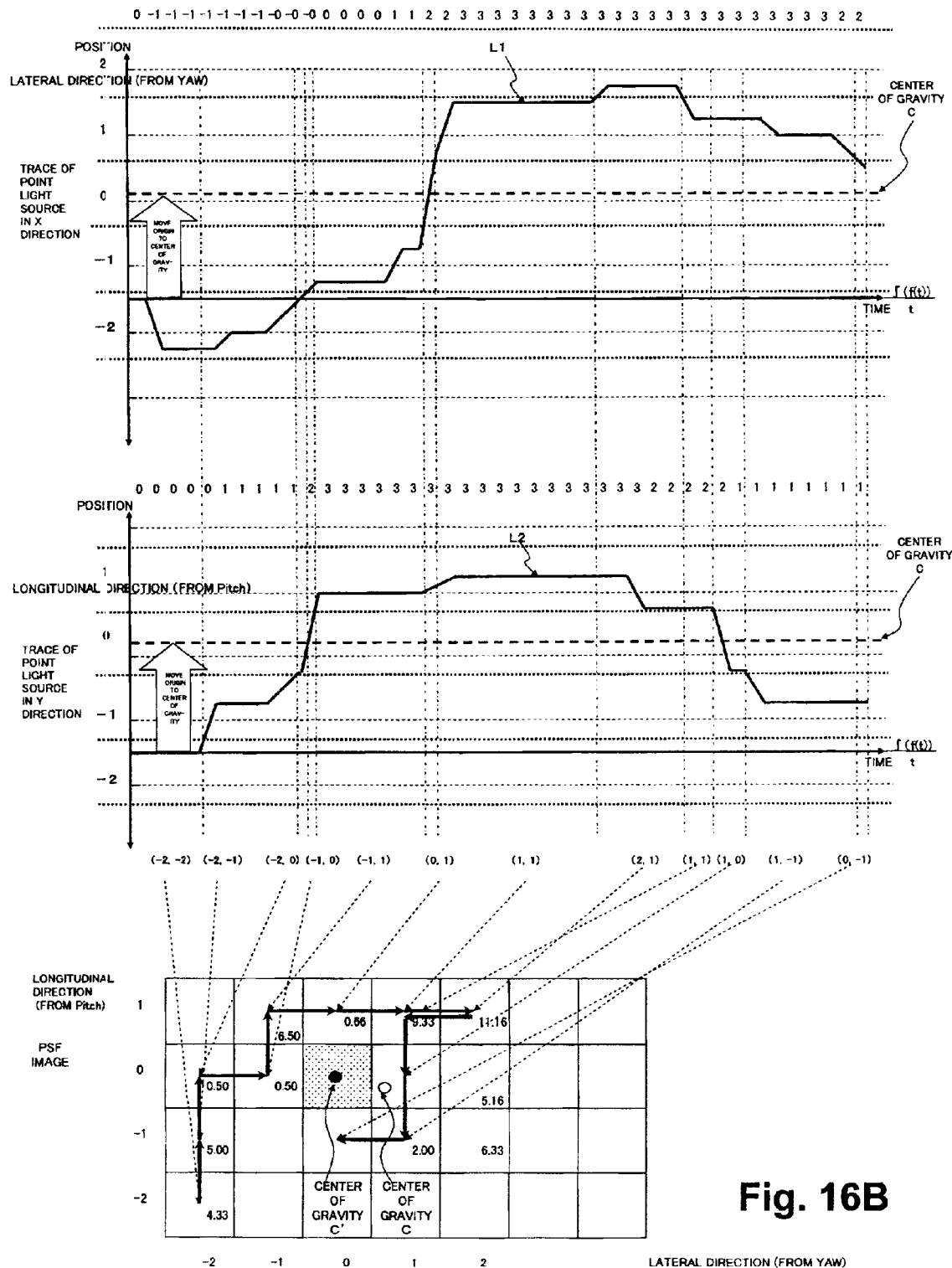
FIG. 16B is a diagram for illustrating the case of moving the center of gravity of the PSF image to a center of a particular pixel.

From the above, FIGS. 16A and 16B show a diagram showing a trace L1 of the point light source in the X direction, which is represented with the lateral axis as a time axis and the longitudinal axis as the distance of the point light source from an origin in the X direction, a diagram showing a trace L2 of the point light source in the Y direction, which is represented with the lateral axis as the time axis and the longitudinal axis as the distance of the point light source from the origin in the Y direction, and further a diagram showing the PSF image obtained based on the traces of the point light source in the X direction and the Y direction. It should be noted that FIG. 16A has a starting point of the point light source as the origin. Moreover, a numerical value shown with the pixel forming the PSF image indicates the brightness value (intensity) of the pixel, and the longer the time for which the point light source exists, the larger the brightness value. In other words, the PSF images shown in FIGS. 16A and 16B correspond to diagrams representing the PSF image shown in three dimensions in FIG. 11B, in two dimensions.

Here, if the brightness value of each pixel of the PSF image is regarded as gravity, and normalization has been performed so that a value obtained by adding the brightness values of all pixels forming the PSF image may become "1", a value obtained by multiplying an x coordinate value of each pixel of the PSF image by the brightness value of each pixel of the PSF image becomes a center of gravity of x coordinate $C_x$, and a value obtained by multiplying a y coordinate value of each pixel of the PSF image by the brightness value of each pixel of the PSF image becomes a center of gravity of y coordinate $C_y$. Thus, for example, a center of gravity C of the PSF image is obtained by the following expression:

[Formula 7]

$C_x \Sigma i \Sigma j P(x_i, y_j) x_i$ $C_y \Sigma i \Sigma j P(x_i, y_j) y_i$ (10)

In the expression (10), a coordinate value of each pixel is $(x_i, y_j)$ and the brightness value of each pixel is $P(x_i, y_j)$, in the case where each pixel of the PSF image is represented in an x-y coordinate system. It should be noted that i and j are indices of the x and y coordinates, respectively.

The center of gravity C of the PSF image obtained as described above is not necessarily located at the center of the pixel, as shown in the PSF image of FIG. 16A. Consequently, the image restoration processing section 36 corrects the center of gravity of the PSF image to be located at the center of the particular pixel forming the PSF image. For example, although the PSF image is obtained with the starting point of the point light source as the origin in FIG. 16A, the PSF image is obtained after the origin is moved from the starting point of the point light source to the position of the center of gravity C, as shown in FIG. 16B. In this way, since a newly obtained center of gravity C' is located at the center of the pixel including the origin, that is, the center of the particular pixel, the phase shift is not caused by the image restoration process.

Figure 17:
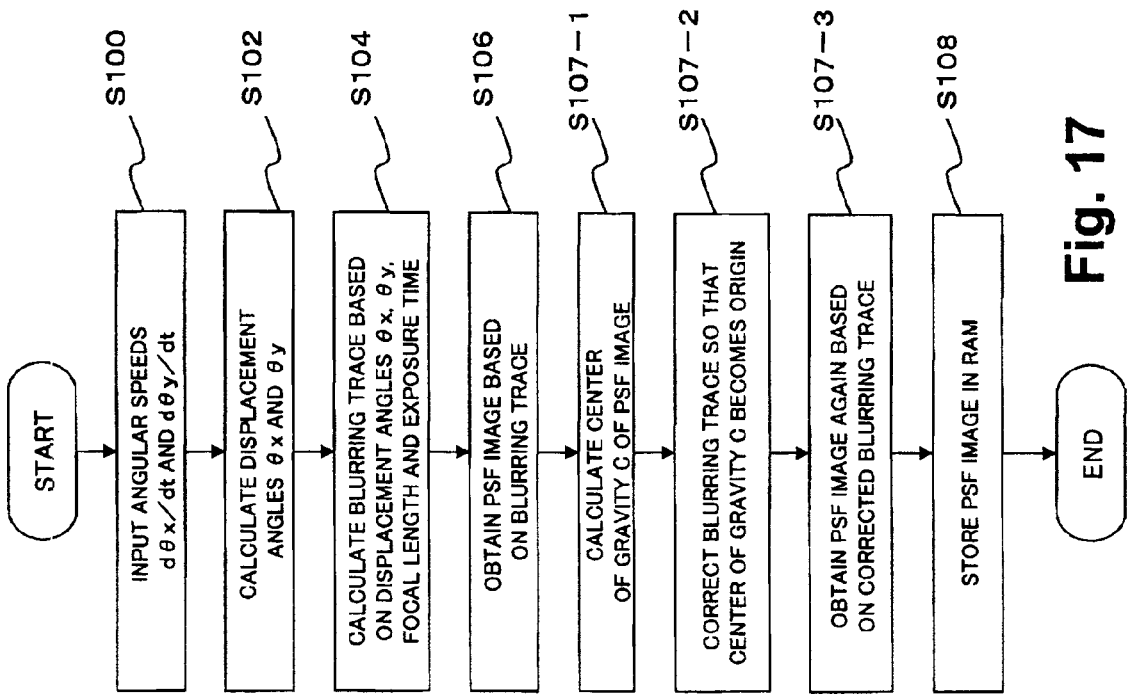
FIG. 17 is a flowchart showing a procedure of calculating the PSF image in which its center of gravity is located at the center of the particular pixel.

FIG. 17 is a flowchart showing a procedure for calculating the PSF image in which its center of gravity is located at the center of the particular pixel (pixel including the origin). It should be noted that contents of the process which are identical to the procedure of calculating the PSF image (degradation function) shown in FIG. 4 are assigned identical reference numerals in FIG. 17, and their description is omitted.

In FIG. 17, after the PSF image is obtained based on the blurring trace at step S106, the CPU 20 calculates the center of gravity C of the PSF image, for example, based on the expression (10) (S107-1). Next, the CPU 20 corrects the blurring trace so that the center of gravity C becomes the origin (S107-2). The CPU 20 further obtains the PSF image again based on the corrected blurring trace (S107-3), and stores that PSF image in the RAM 24 (S108). According to the above described procedure, it is possible to obtain the PSF image having the center of gravity located at the center of the particular pixel.

As described above, with the PSF image having the center of gravity located at the center of the particular pixel, the color drift may be decreased even if the contents of the image restoration process are changed for each color component image.

It should be noted that the above described embodiment and the respective variations may be practiced independently or used in combination with the variations. In other words, if the size of the PSF image is large, when the image restoration process is performed with regard to the R and B component images, the image restoration processing section 36 may perform the image restoration process only with regard to the edge portions of the R and B component images, or may perform the image restoration process after converting the resolutions of the R and B component images.

Moreover, the above described image processing section 30 may be realized by installing programs for embodying the various processes such as the image restoration process and the like in a microcomputer, and executing these programs.

In other words, the microcomputer has various memories such as a CPU, a ROM, a RAM, an EEPROM and the like, a communication bus and an interface, and reads image processing programs such as the image restoration algorithm and the like stored previously as firmware in the ROM to be sequentially executed by the CPU. The CPU receives the blurred image inputted from the image sensor of CCD (Charge Coupled Devices) or COMS and the like via the interface, and separates the blurred image into the R component image, the G component image and the B component image. Furthermore, the CPU performs the image restoration process with regard to the G component image by using the PSF image. Then, the CPU performs the various image processes such as the white balance adjustment, the color correction and the y correction and the like, together with regard to the G component image having been subjected to the image restoration process, and the R and B component images not having been subjected to the restoration process. In this way, the CPU generates the restored image corresponding to the blurred image.

PARTS LIST 10 imaging section
12 optical system
14 image sensor
16 CDS-A/D circuit
20 CPU 22 ROM
24 RAM
30 image processing section
32a first image memory
32b second image memory
34 RGB interpolation section
36 image restoration processing section
38a RGB to YCC section
38b YCC to RGB section
38c WB section
38d color correction section
38e γ correction section
38f RGB to YCC section
38g edge processing section
38g edge processing section
40 display device
50 recording medium
60 hand movement detection section
361 parameter setting section
362a G restoration processing section
362b Gr and Gb restoration processing section
362c Y restoration processing section
362d R restoration processing section
362e B restoration processing section
363 separation section
364 edge extraction section
365 image generation section
366 size determination section
367 resolution conversion section

What is claimed is:

1. An image processing apparatus comprising:
an image separation section for separating a plurality of color component images forming a blurred image which is captured in accordance with a contribution level to a brightness component into a first image and a second image having a smaller contribution level to the brightness component than the first image;
an image restoration processing section for performing an image restoration process with regard to each of the first and the second images based on a predetermined image restoration algorithm including an iterative computation using a PSF image representing a point spread function which is defined by an image capturing condition and iteratively processing the image, at least once, until a difference between the image after any processing and the immediately preceding image is less than a predetermined threshold value; wherein the iterative computation performs computation on any portion of a particular image and repeats the computation process on all or substantially all of the previously computed processed portion;
a parameter setting section for setting parameters of the iterative computation including the threshold value: and
a restored image generating section for generating a restored image corresponding to the blurred image based on the first and the second images having been subjected to the image restoration process; wherein
the parameter setting section sets the threshold value with regard to the second image greater than the threshold value with regard to the first image.

2. The image processing apparatus according to claim 1, wherein the image restoration processing section does not perform the image restoration process with regard to the second image based on the image restoration algorithm if a size of the PSF image is smaller than or equal to a predetermined size, and performs the image restoration process also with regard to the second image based on the image restoration algorithm if the size of the PSF image is larger than the predetermined size.

3. The image processing apparatus according to claim 2, wherein:
the image restoration algorithm is an algorithm using the iterative computation with a steepest descent method, in which if the blurred image is G, the restored image is F and the PSF image is H, the image restoration process is performed by calculating an evaluation value J based on a size of a difference between an image HF obtained by causing the PSF image H to operate on the restored image F, and the blurred image G, and iteratively performing a process of calculating the restored image F and a process of calculating the evaluation value J until a size of a gradient of the evaluation value J becomes smaller than or equal to a threshold; and
the threshold with regard to the second image is larger than the threshold with regard to the first image.

4. The image processing apparatus according to claim 1, wherein:
the image restoration processing section extracts an edge portion from the second image and performs the image restoration process with regard to the extracted edge portion; and
the restored image generating section generates the restored image corresponding to the blurred image based on the first image having been subjected to the image restoration process and the second image having been subjected to the image restoration process with regard to the edge portion.

5. The image processing apparatus according to claim 1, wherein:
the image restoration processing section performs a resolution conversion on the second image so that a resolution of the second image becomes lower than a resolution of the first image, and performs the image restoration process with regard to the second image having been subjected to the resolution conversion; and
the restored image generating section generates the restored image corresponding to the blurred image based on the first image having been subjected to the image restoration process and the second image having been subjected to the image restoration process after the resolution conversion.

6. The image processing apparatus according to claim 1, wherein the image restoration processing section corrects the PSF image so that a center of gravity of the PSF image is located at a center of a particular pixel forming the PSF image, and uses the corrected PSF image to perform the image restoration process.

7. The image processing apparatus according to claim 1, further comprising a pixel interpolation section for performing only a pixel interpolation which is a linear interpolation with regard to the blurred image before the image restoration processing section performs the image restoration process.

8. The image processing apparatus according to claim 1, wherein the first image is a G component image, and the second image is an R component image and a B component image.

9. The image processing apparatus according to claim 1, wherein the first image is a brightness component image, and the second image is a color difference component image.

10. A program for causing a computer to function as an image processing apparatus which generates a restored image from a blurred image which is captured, based on a predetermined image restoration algorithm using a degradation function which is defined by an image capturing condition, the program causing the computer to function as:

an image separation section for separating a plurality of color component images forming a blurred image which is captured in accordance with a contribution level to a brightness component into a first image and a second image having a smaller contribution level to the brightness component than the first image;

an image restoration processing section for performing an image restoration process with regard to each of the first and the second images based on a predetermined image restoration algorithm including an iterative computation using a PSF image representing a point spread function which is defined by an image capturing condition and iteratively processing the image, at least once, until a difference between the image after any processing and the immediately preceding image is less than a predetermined threshold value; wherein the iterative computation performs computation on any portion of a particular image and repeats the computation process on all or substantially all of the previously computed processed portion;

a parameter setting section for setting parameters of the iterative computation including the threshold value: and a restored image generating section for generating a restored image corresponding to the blurred image based on the first and the second images having been subjected to the image restoration process; wherein the parameter setting section sets the threshold value with regard to the second image greater than the threshold value with regard to the first image.

11. The program according to claim 10, wherein the image restoration processing section corrects the PSF image so that a center of gravity of the PSF image is located at a center of a particular pixel forming the PSF image, and uses the corrected PSF image to perform the image restoration process.

* * * * *